United States Patent [19]
Potter et al.

[11] Patent Number: 5,348,924
[45] Date of Patent: Sep. 20, 1994

[54] ZEOLITE AGGREGATES AND CATALYSTS

[75] Inventors: Mark J. Potter, League City; Jar-Lin Kao; Virginia R. Cross, both of Houston, all of Tex.; Thomas H. Vanderspurt, Stockton, N.J.; Edward K. Dienes, Louisville, Ky.; Robert E. Riley, Elizabeth; Freddie L. Tungate, Georgetown, both of Ind.; Arie Bortinger, Ridgewood, N.J.

[73] Assignee: Exxon Research & Engineering, Linden, N.J.

[21] Appl. No.: 23,733

[22] Filed: Feb. 23, 1993

Related U.S. Application Data

[63] Continuation of Ser. No. 414,285, Sep. 29, 1989, abandoned.

[51] Int. Cl.$^5$ .................... B01J 29/04; B01J 20/18; B01J 37/00
[52] U.S. Cl. ........................ 502/66; 502/10; 502/64; 502/69
[58] Field of Search .................. 502/10, 64, 66, 69

[56] References Cited

U.S. PATENT DOCUMENTS

| | | | |
|---|---|---|---|
| 2,865,866 | 12/1958 | Hoekstra | 502/10 |
| 3,216,789 | 11/1965 | Breck et al. | 23/113 |
| 3,326,818 | 6/1967 | Gladrow et al. | 502/64 |
| 3,557,024 | 1/1971 | Young et al. | 502/64 |
| 4,046,713 | 9/1977 | Mitsche et al. | 423/628 |
| 4,104,320 | 8/1978 | Bernard et al. | 423/328 |
| 4,305,811 | 12/1981 | Johnson | 208/139 |
| 4,305,812 | 12/1981 | Shih et al. | 208/309 |
| 4,306,963 | 12/1981 | Johnson | 208/139 |
| 4,311,582 | 1/1982 | Johnson et al. | 208/139 |
| 4,356,338 | 10/1983 | Young | 585/407 |
| 4,392,988 | 7/1983 | Dobson et al. | 502/10 |
| 4,411,771 | 10/1983 | Bambrick et al. | 502/10 |
| 4,416,806 | 11/1983 | Bernard et al. | 502/74 |
| 4,417,083 | 11/1983 | Bernard et al. | 585/419 |
| 4,424,144 | 1/1984 | Pryor et al. | 502/10 |
| 4,430,200 | 2/1984 | Shihabi | 208/120 |
| 4,447,316 | 5/1984 | Buss | 208/138 |
| 4,458,025 | 7/1984 | Lee et al. | 502/66 |
| 4,517,306 | 5/1985 | Buss | 502/74 |
| 4,532,856 | 11/1985 | Tauster et al. | 502/74 |
| 4,544,539 | 10/1985 | Wortel | 423/328 |
| 4,579,831 | 4/1986 | Field | 502/66 |

FOREIGN PATENT DOCUMENTS

| | | |
|---|---|---|
| 0220616 | 5/1987 | European Pat. Off. |
| 0314336 | 5/1989 | European Pat. Off. |
| 2106413 | 4/1983 | United Kingdom |

Primary Examiner—Carl F. Dees
Attorney, Agent, or Firm—Edward F. Sherer

[57] ABSTRACT

A process for producing zeolite aggregates involves providing a formable paste composed of zeolite, a binder composed of an organic/metal oxide containing aluminum, a peptizing agent and water; forming the paste into an aggregate, preferably by extruding into an extrudate; curing the aggregate; hydro-thermally calcining the aggregate; and washing the hydro-thermally calcined aggregate with a washing medium, preferably followed by rinsing with a rinsing medium to remove residual washing medium from the aggregate. The washed and rinsed aggregate may then be permitted to equilibrate or is subjected to a drying procedure. Preferably, the washed and rinsed aggregate is again subjected to curing/hydro-thermal calcining. The resultant aggregates, such as extrudates, have an exterior surface with openings and interstitial spaces between particles of binder and zeolite which communicate by such openings between the exterior surface of the aggregate and micropores of the zeolite; the aggregates also exhibit characteristics of crush strength greater than about 0.9 pounds per millimeter and a loss by attrition of less than about 3.0%. Regenerable catalysts, such as reforming catalysts, based on such aggregate also exhibit a catalyst activity pass through to the zeolite bound in the aggregate of at least 70% of the initial catalyst activity of freshly prepared zeolite, as well as exhibiting more than about 70% of the reforming benzene yield that the reforming catalyst exhibited when similarly tested prior to being exposed to a hydrocarbon stream under specified reforming conditions of the catalyst activity test procedures.

247 Claims, 6 Drawing Sheets

ZEOLITE AGGREGATES AND CATALYSTS

This is a continuation of co-pending application Ser. No. 07/414,285 filed on Sep. 29, 1989, now abandoned, the disclosure of which in its entirety is incorporated herein by reference.

BACKGROUND OF THE INVENTION

1. Field of Invention

This invention relates generally to processes for forming aggregates, such as extrudates, containing zeolite for use as adsorbents and as substrates for chemical catalysts.

More specifically, the present invention is directed to producing aggregates which are "skin-free" i.e., essentially devoid of substance which interferes with communication between openings in the exterior surface of the aggregate, micropores of the zeolite bound in the aggregate, and mesopores or interstitial spaces within the aggregate communicating between these openings to the exterior surface of the aggregate and the micropores for the zeolite.

Related to this, the present invention is also directed to producing aggregates which have a crush strength greater than about 0.9 pounds per millimeter; and loss by attrition of less than about 3.0%. Catalysts based on such aggregates also exhibit catalyst activity pass through to the zeolite bound into the aggregate of at least about 70% of the catalyst activity of the freshly prepared zeolite prior to being bound therein.

The present invention is also directed to regenerable catalysts, such as reforming catalysts, which are composed of a catalyst metal dispersed in zeolite, bound by a binder composed of a metal oxide containing aluminum formed into such aggregate, wherein the catalyst exhibits a level of regenerability, expressed as a ratio of the catalyst activity test rating of the catalyst as regenerated relative to the catalyst activity test rating of the catalyst in a fresh state prior to operation on oil, of at least 70%.

The present invention is also directed to reforming processes which involve exposing a hydrocarbon stream under reforming condition to a regenerable catalyst, produced in accordance with the present invention, in addition to processes for purifying a hydrocarbon stream by contacting the hydrocarbon stream under conditions suitable for adsorption of contaminants from the hydrocarbon stream with an aggregate produced in accordance with the present invention.

2. Discussion of Background and Material Information

Since the advent of high compression automobile and aircraft gasoline engines in the late 1930s, the demand for high octane gasoline has risen continuously. Part of the octane requirement is satisfied by adding organolead compounds and oxygenated organic compounds to motor gasoline blends. Also, catalytic reforming, a major petroleum refining process is used to raise the octane rating of hydrocarbons, such as naphthas ($C_5$ to $C_{11}$ hydrocarbons), for gasoline blending. Catalytic reforming is also a principle source of industrially important light aromatic chemicals (benzene, toluene and xylenes) via conversion of paraffins and naphthenes to aromatics. The principle chemical reactions which occur during reforming are dehydrogenation of cyclohexane to aromatics, dehydrocyclization of paraffins to aromatics, dehydroisomerization of alkylcyclopentanes to aromatics, isomerization of normal paraffins to branched paraffins, dealkylation of alkylbenzenes, and cracking of paraffins to light hydrocarbons. The last reaction is undesirable since it produces light hydrocarbons which have low value. Also, coking and agglomeration of catalytic metals occur, which lead to deactivation of the catalyst over time.

Reforming is carried out at temperatures between about 800° F. to about 1000° F., pressures of about 50 to about 300 psi, weight hourly space velocities of 0.5 to 3.0, and in the presence of hydrogen at hydrogen to hydrocarbon molar ratios of 1 to 10. Commercial reforming units typically include a multiplicity of adiabatic packed bed reactors connected in series. Both axial and radial flow reactors are employed and these can be either stationary or moving bed reactors.

The hydrocarbon feed is vaporized, mixed with hydrogen and preheated in a furnace to about 800° F. to 1000° F. and fed into the inlet of the lead reactor. Reforming is a net endothermic process so the temperature of the reacting gas stream drops as the stream moves through the reactors, and reactor effluents are usually in the lower end of the 800° F. to 1000° F. reforming temperature range. Accordingly, reactor effluent streams are reheated in furnaces installed upstream of each of the reactors. The product stream from the tail reactor is cooled and flashed to low pressure in a drum and separated into a liquid reformate stream rich in aromatics, and a gas stream rich in hydrogen. Part of the hydrogen stream is recycled into the feed stream using a compressor to provide the hydrogen required for the process. Reforming is a net hydrogen producing process. The net hydrogen produced in the process is removed as a gas stream from the flash drum, which is recovered and purified.

Currently, the most widely used commercial reforming catalysts are comprised of a Group VIII metal such as platinum or platinum plus a second catalytic metal such as rhenium or iridium, dispersed on an alumina substrate. These catalysts are bifunctional; that is they have two types of catalytic sites: metal sites and separate strong acid sites. Typically, chlorine is incorporated on the alumina to add strong acid site functionality. These catalysts accomplish dehydrogenation and cyclization reactions on the metal sites and the isomerization reactions on the strong acid sites. Cracking reactions, which are undesirable because they convert feed to low value gases, occur primarily on the acid sites. These alumina based bifunctional reforming catalysts are effective for aromatizing C8+paraffins but are less effective for aromatizing C6 to C8 paraffins; they crack more of the lighter paraffins to low value fuel gas than they convert to aromatics.

Within the past few years new reforming catalysts have been discovered which are more effective for aromatizing the C6 to C8 paraffin components of naphthas. These new catalysts employ large pore zeolites to support the catalytic metal. The zeolite catalysts are mono-functional; they contain few strong acid sites. They accomplish the isomerization, as well as dehydrogenation reactions on the metallic catalytic sites with facility. Unwanted cracking reactions are repressed because there are few strong acid sites in the catalysts.

Large pore zeolites, i.e., zeolites with effective pore diameters of 6 to 15 Angstroms, are preferred for reforming catalysts. Suitable large pore zeolites include zeolite X, zeolite Y, and zeolite L. The preferred large pore zeolite for reforming catalysts is zeolite L which is described in detail in U.S. Pat. No. 3,216,789, hereby incorporated by reference thereto herein.

U.S. Pat. Nos. 4,104,320, 4,416,806 and 4,417,083 disclose the use of zeolite L as substrates for reforming catalysts. Specific morphological forms of zeolite L which convert to superior reforming catalysts are disclosed in U.S. Pat. Nos. 4,552,856, and 4,544,539.

Ideally, reforming catalysts should i) display high activity and selectivity to aromatics and isoparaffins; ii) be regenerable; iii) survive a cost effective number of regenerations; iv) possess sufficient crush strength and loss by attrition to avoid excessive breakdown in reactors (because pressure drop across commercial reactors can become unacceptably high if the amount of catalyst fines in the catalyst becomes excessive); and v) be sufficiently cost effective not to add unreasonably to the cost of operation.

Reforming catalysts containing platinum, with or without the addition of other promoter metals such as rhenium, have been used for some time. These metals are often supported on alumina.

Catalysts containing type L zeolite have been discovered to be useful for catalytic dewaxing and in other applications. They are also particularly useful in reforming because they are effective for aromatizing $C_6$-$C_8$ paraffin components and crack less feed to gas relative to conventional catalysts. In this regard, U.S. Pat. Nos. 4,104,320; 4,417,083; 4,416,806 and British Application 2106413A, Bernard et al., disclose the use of zeolite L as a support which increases the selectivity of the reaction for producing aromatic products and also disclose processes for using the zeolite L and methods for its regeneration.

Catalysts of platinum on potassium type L zeolites have been disclosed in U.S. Pat. Nos. 4,552,856, TAUSTER et al., and U.S. Pat. No. 4,544,539, WORTEL, the latter of which is directed to an improved cylindrical zeolite L aromatization catalyst.

Zeolites are synthesized as microcrystals typically 5 to 20 thousand angstroms in size. To be suitable for use in commercial packed bed reactors, zeolites in their natural fine powder state must be formed into aggregates, such as aggregated particles, for example, tablets, spheres, prills, pills or extrudates, typically 1/32 to ⅛ of an inch in size. If zeolite powder were to be charged to the reactors as synthesized, pressure drop across the catalyst beds at commercially viable feed rates would be impractically high. Commonly, inorganic oxides such as alumina, silica, alumino-silicates and clays are used as binders to hold the aggregates together. The aggregates must have sufficient crush and loss by attrition so that they do not disintegrate in the packed bed reactors under normal commercial operating conditions but also the zeolite should retain an effective level of the catalytic activity it exhibits in the unbounded form and the binder should not add undesirable chemical activity to the catalyst's functionality, i.e., a combination of attributes most difficult to accomplish.

In the production of type L zeolites reforming catalyst, it is known in the art to use alumina as a binder or support. For example, U.S. Pat. Nos. 4,458,025, Lee et al., 4,517,306, Buss, and its divisional 4,447,316 both make such a suggestion. The disclosure in U.S. Pat. No. 4,458,025 suggests extrusion of a type L zeolite in alumina.

Related to this, U.S. Pat. No. 3,326,818, GLADROW et al., disclose a catalyst composition made up of a crystalline aluminosilicate and a binder prepared by mixing the crystalline aluminosilicate in a minor amount of dry inorganic gel binding agent, such as alumina. The alumina is disclosed as containing a minor amount of a peptizing agent for the purpose of enhancing the strength of the resulting product.

U.S. Pat. No. 3,557,024, Young et al., disclose alumina bound catalysts having a composition formed by mixing one of a number of zeolites, including zeolite L, with a binder of hydrous boehmitic alumina acidified with at least 0.5 mole equivalent of a strong acid per mole of alumina. The catalyst is disclosed as having enhanced strength.

U.S. Pat. No. 4,046,713, MITSCHE et al., disclose a method for preparing an extruded catalyst composition wherein acidic alumina hydrosol is admixed with a dry mixture of a finely divided alumina, preferably a hydrate, and a finely divided crystalline aluminosilicate, such as mordenite. The resulting mixture is extruded, dried and calcined to form a catalyst disclosed as being useful in the reforming of various naphthas. The aluminosilicate makes up less than 20% of the mixture.

U.S. Pat. Nos. 4,305,812; 4,305,811; 4,306,963; and 4,311,582, JOHNSON and JOHNSON et al., are directed to stabilized reforming catalysts which are halide promoted. Each of the catalysts is produced by employing a modified alumina support whose alumina precursor includes at least about 75% by weight boehmite.

LEE and SANTILLI in U.S. Pat. Nos. 4,458,025 and FIELD, 4,579,831, disclose a process for making a zeolite L catalyst by mulling a non-acidic alumina sol with zeolite L and extruding the resulting paste.

In LEE and SANTILLI, U.S. Pat. No. 4,458,025, it is disclosed that after the alumina is peptized with acid to form a sol, the resultant alumina sol is back-neutralized to neutrality. Where a non-acidic alumina sol is peptized with a base, no back-neutralization and wash is needed. After extrusion, the extrudate is dried and calcined at about 1,000° F. for about 1-2 hours.

In U.S. Pat. No. 4,579,831, FIELD, the alumina used as the binder contains either an alkali or an alkaline earth component. The catalyst is disclosed as being formed by forming a solution of an alkali metal aluminate then adjusting the pH of the solution to a pH of from 6 to 8, and aging the solution. The aluminate solution is then filtered, dried and mulled with a large-pore zeolite to form a mixture which is extruded to form an extrudate which is dried, calcined and impregnated or exchanged with a Group VIII metal to form a catalyst which is subsequently dried and calcined. It is disclosed that the extrudate is dried and calcined to add strength to the resultant catalyst and should be conducted in a first step of about 1100° F. for about 2 hours. Once the extrudate has been calcined and impregnated with the Group VIII metal to form a catalyst, the catalyst is then dried and subjected to a second calcination at a temperature of about 500° F., instead of the 1000° F. used in the first calcination.

TROWBRIDGE in pending U.S. Pat. application Ser. No. 06/880,087 (now abandoned) teaches extruding zeolites using a two-component alumina binder comprised of boehmitic alumina and an acidic alumina sol, the disclosure of which is hereby incorporated in its entirety by reference thereto.

Conventional zeolite extrudates used as catalyst substrates, however, tend to have a relatively thick outer skin of alumina, and a coating of alumina, surrounding the zeolite crystals which inhibits catalyst activity. In addition, conventional alumina bound zeolite X aggregates contain residual acidity which induces cracking and impairs activity and selectivity maintenance under reactive conditions.

SUMMARY OF THE INVENTION

The present invention is directed to producing aggregates, such as extrudates, which have sufficient crush and loss by attrition to limit disintegration in commercial packed bed chemical reactors and which also retain much of the desirable activity and selectivity of the zeolite crystals before being incorporated into the aggregates. The zeolite aggregates produced in accordance with the present invention are unique because they have sufficient crush strength and loss by attrition for use in industrial packed bed chemical reactors while also passing through acceptable levels of the catalytic activity of the zeolite in the aggregate as measured before the unbound zeolite was formed into an extrudate. Prior to the present invention, it is not believed that aggregates of bound zeolites were formed which exhibited good mechanical strength without losing a significant level of the activity of the unbound zeolite. In this regard, it has been observed that when cohesion between the zeolite crystals and the binder is adequate to impart the requisite crush strength and loss by attrition to the extrudate, a film or "skin" of binder forms around the individual zeolite microcrystals and the exterior surfaces of the extrudates. This film phenomenon is usually associated with "low activity pass through" extrudates, i.e., the zeolite when converted to an extrudate and loaded with catalytic metal has substantially lower activity than the same amount of zeolite loaded with the same type and amount of catalytic metal.

It has been observed, by inspection of electron microscope photomicrographs of extrudates, that the preferred zeolite extrudates produced in accordance with the present invention, as described herein, manifest little or no film or skin formed around either the exterior of the individual zeolite crystals or the exterior surfaces of the extrudates, which are common to conventional zeolite extrudates. In this regard, the skin-free aspect of the aggregates and extrudates in accordance with the present invention is described herein as an aggregate having an exterior surface and interstitial spaces or mesopores communicating by openings with the exterior surface, and zeolite crystals having micropores bound in the aggregate, wherein the exterior surface of the aggregate and the zeolite are essentially devoid of substance which interferes with communication among the micropores, interstitial spaces or mesopores, and openings for conducting reactants and products between the exterior surface of the aggregate and the micropores of the zeolite. Such skin or film of substance is undesirable because such film impairs catalytic activity and adsorption performance.

The present invention is also directed to a process for producing zeolite aggregates or extrudates which involves curing and hydro-thermally calcining aggregates, such as extrudates, in a specific and prescribed manner, as defined herein, to achieve the requisite catalytic activity in the finished catalyst. During these procedures, bonds are formed between the binder particles and between the binder and zeolite that harden and strengthen the extrudate aggregates. Although not wishing to be bound by any particular theory, it is believed that during curing and hydro-calcination, in addition to hardening the extrudate the surface area, the chemical nature of the binder surface changes to a more passive and to a less deleterious catalyst form, and the binder surface area decreases when the curing and hydro-calcination steps are properly performed as described herein. Preferably the curing step is also conducted in a humid atmosphere.

In accordance with a preferred embodiment of the present invention, the steps in the process for producing zeolite extrudates of requisite crush strength and loss by attrition which retain desirable activity and selectivity of the zeolite involves: i) preparing a paste including zeolite and a suitable binder suitable for extrusion ii) extrusion iii) curing iv) hydro-thermal calcination and v) washing.

It has also been discovered that preferred results are achieved when the washed aggregate is rinsed and then dried or otherwise treated to remove at least surface moisture from the aggregate. For example, this may be accomplished by permitting the aggregates to set and come to equilibrium with the environment, or the aggregates may be dried, for example, in a forced air stream. Preferably, however, the aggregates are again subjected to curing and/or hydro-thermal calcining under conditions which are substantially the same as those used prior to washing.

The zeolite aggregates or extrudate products of the present invention are used in zeolite packed bed adsorbers and catalytic chemical reactors and have been discovered to retain most of the chemical activity of the zeolite before and after regeneration. The extrudates produced in accordance with the processes of the present invention are substantially free of binder skin and other detrital components both at the outer surface of the extrudate particles and around the zeolite particles within the extrudate.

The process descriptions and examples which follow may pertain to one specific zeolite extrudate which is comprised of a zeolite L substrate bound with alumina and loaded with platinum which has been discovered to be a preferred reforming catalyst. However, the techniques and inventive concepts taught herein are generally applicable for other zeolites and binders to produce superior extruded zeolites for catalyst substrates and absorbents.

DETAILED DESCRIPTION

Figure 1:
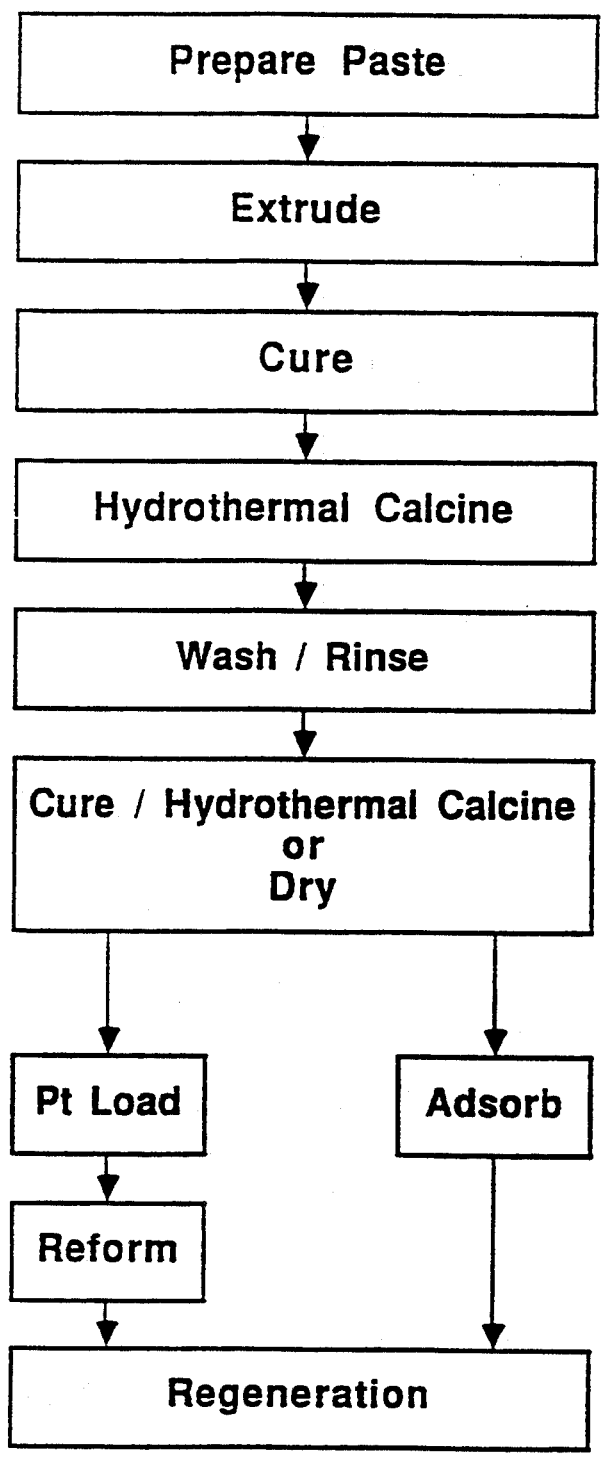
FIG. 1 is a simplified block flow diagram of the process for producing the zeolite L reforming catalyst including the paste mixing, extrusion, curing, hydro-thermal calcination, washing and final curing and final hydro-thermal calcination operations.

The present invention is directed to processes for producing aggregates of zeolite, and preferably extrudates of zeolite, wherein an aggregate or extrudate of metal/inorganic oxide containing aluminum, zeolite, water and peptizing agent is subjected to a sequence of steps which involves curing the aggregate, hydro-thermally calcining the aggregate and washing the aggregate. The washed aggregate is then preferably rinsed and, subjected to a treatment to remove excess, surface or free water, for example, by equilibrating or being subjected to a drying operation. Most preferably the washed and rinsed aggregate is again subjected to curing and/or hydro-thermally calcining treatments.

A preferred process for producing aggregates of zeolite in accordance with the present invention, however, involves forming the aggregate or extrudate of zeolite by first combining a source of alumina with zeolite to form a mixture comprising alumina and zeolite; adding a peptizing agent and water to form a resultant mixture comprising, alumina, zeolite, peptizing agent and water; followed by preparing the resultant mixture into a paste comprising alumina, zeolite, peptizing agent and water prior to forming the paste into an aggregate, preferably by extruding the paste to form an extrudate.

In the processes for producing aggregates and extrudates in accordance with present invention, the previously mentioned curing step is performed at temperatures within the range of 180° F. to about 250° F., for a time within a range of about 1 to about 20 hours, and more preferably at a temperature range of about 195° F. for a time within the range of about 2 to 6 hours. The curing is performed under a humid atmosphere, preferably having a volume percent water within the range of about 40% to about 100%.

The hydro-thermal calcining step involves subjecting the cured aggregate to a humid atmosphere at elevated temperatures for times which are sufficient to calcine the cured aggregate or extrudate to strengthen, harden and passivate the cured catalyst without destruction of the zeolite contained therein or blocking access to micropores of the zeolite. Accordingly, temperatures of up to about 1300°–1400° F. may be used for this purpose over a period of time up to about 15 hours. The hydro-thermal calcining step preferably involves raising the temperature of the aggregate or extrudate to a first target temperature within the range of about 400° F. to about 700° F. and most preferably where the first target temperature is about 550° F. Raising the temperature of the aggregate and extrudate to the first target temperature is preferably accomplished by increasing the temperature of the aggregate or extrudate from an initial temperature to the first target temperature at a rate within the range of about 1° F. to about 20° F. per minute, and preferably at or about 7° F. The hydro-thermal calcining further involves maintaining this first target temperature for a time of less than about 5 hours, and preferably within the range of about 1–3 hours.

Preferably, the hydro-thermal calcining also involves increasing the temperature of the aggregate to a second target temperature higher than the first target temperature but less than about 1400° F., and more preferably within the range of about 1000° C. to 1200° C. Again, increasing the temperature of the aggregate or extrudate to the second target temperature preferably involves increasing the temperature of the aggregate from the first target temperature at a rate within the range of about 1° F. and 20° F. per minute, and preferably at or about 7° F. Preferably, the second target temperature is maintained for a period of time of less than about 5 hours and is preferably maintained at the second target temperature for a period of time within the range of about 1–3 hours. The humid atmosphere of the hydro-thermal calcining step preferably includes a volume percent water within the range of 30% to 100%, and preferably 50% to about 80%.

In the processes of the present invention, as described above, the washing medium preferably includes a substance for dissolving detrital alumina from the hydrothermally calcined aggregate and for neutralizing the acidity thereof, such as a solution of base, preferably containing a cation which is the same as cations contained in the zeolite, and is most preferably KOH solution. For purposes of the present invention, the solution of base is within the range of 0.01 to 1.0 normal, and the aggregates or extrudates are exposed to an amount of the solution of base in the range of about 1.5 to 3.0 times the weight of the calcined aggregates or extrudates, preferably for a period of time within about 20 to about 60 minutes. For purposes of the present invention, suitable solutions of washing medium include solutions containing at least one member selected from the group consisting of potassium hydroxide, sodium hydroxide, barium hydroxide, lithium hydroxide, rubidium hydroxide, and cesium hydioxide, as well as solutions of basic salts of chelating agents including basic salts of amino polycarboxylic acids, wherein the solutions of basic salts of amino polycarboxylic acids are selected from the group consisting of solutions of basic salts of nitrilotriacetic acid and basic salts of ethylenediaminetetraacetic acid, such as solutions of basic salts of ethylenediaminetetraacetic acid, wherein the solutions of basic salts of ethylenediaminetetraacetic acid are selected from the group consisting of potassium ethylenediaminetetraacetic acid and sodium ethylenediaminetetraacetic acid as well as potassium salts of ethylenediaminetetraacetic acid and sodium salts of ethylenediaminetetraacetic acid. The washing procedure also preferably involves rinsing the washed aggregates or extrudates with a rinsing medium to remove the washing medium from the aggregate or extrudate wherein the preferred rinsing medium is water and the rinsing is carried until the pH of the effluent water is reduced to between about 10.0–11.0 and preferably within the range of about 10.5 to about 10.8.

Following washing and/or rinsing of the aggregates or extrudates, the aggregates or extrudates may be permitted to equilibrate, may be subjected to drying, but are preferably subjected to a curing and/or hydro-thermal calcining steps, as previously described.

In accordance with the processes for producing aggregates and extrudates of the present invention as described above, the paste should be prepared by mixing the paste ingredients to a consistency suitable for extrusion, preferably wherein the paste has an alumina content within the range of about 25% to about 70% on a dry weight basis of the aggregates or extrudates, and more preferably within the range of 25% to 35% on a dry weight basis, and preferably has a moisture content of about 30% to about 40% by weight.

In accordance with the processes of the present invention, as described above, the peptizing agent should be added in a manner so as to become evenly distributed throughout the mixture in less than about two minutes so as to substantially avoid forming zones in the mixture having relatively higher concentrations of the peptizing agent.

Peptizing agents suitable for purposes of the present invention are substances which have a pH of equal to or less than about 4.0 or a pH of equal to or greater than 10.0 including acidic substances, such as acids which are selected from the group consisting of organic acids, hydrochloric acid, and nitric acid wherein the organic acid is selected from the group consisting of acetic acid, formic acid, propionic acid, citric acid, trichloroacetic acid, chloroacetic acid, and oxalic acid, with nitric acid being the most preferred peptizing agent. Alternatively, the peptizing agent may be a basic substance, in which case KOH is preferred. Acidic substances, which may also be used as peptizing agents, include acidic alumina sols, alumina chloride, alumina bromide, perchloric acid, and hydrobromic acid.

In accordance with the process for producing aggregates of the present invention, as described above, the initial mixture of zeolite and alumina is preferably provided by agitating the zeolite and a source of alumina in a mixer to form a uniform mixture having a moisture content provided essentially by the water which is present in the zeolite and adsorbed on the alumina; it is preferred that no extraneously added water be introduced at this stage.

The binder component of the aggregates and extrudates produced in accordance with the processes of the present invention, as described above, may be a metal/inorganic matrix containing aluminum, and preferably is a source of alumina, such as hydrated alumina, preferably selected from the group consisting of boehmite, and mixtures of boehmite and pseudo-boehmite. The alumina preferred for purposes of the present invention preferably is in the form of particles having a particle size within the range of 10 to about 100 microns, and preferably has an average particle size of about 65 microns. As used herein, metal oxide is meant to include both crystalline and amphorous metal ox-hydroxides, hydroxides and hydrated oxides and mixtures of metal ox-hydroxides, hydroxides, and hydrated oxides.

The aggregate and extrudates produced in accordance with the present invention are composed of zeolite bound in such an inorganic oxide matrix, as described above, and formed into an aggregate or extrudate having an exterior surface and interstitial spaces or mesopores communicating by openings with the exterior surface of the aggregate. The aggregates and extrudates of the present invention preferably exhibit the following characteristics: a crush strength greater than about 0.9 pound per millimeter; loss by attrition of less than about 3.0%, preferably wherein the crush strength is greater than about 1.25 pounds per millimeter; and the loss by attrition is less than about 2.0%. The catalyst activity pass through to the bound zeolite in catalysts produced in accordance with the present invention is at least about 70% of the catalyst activity of the zeolite.

As used herein, the term substantially "skin-free" refers to aggregates or extrudates, having an exterior surface and interstitial spaces or mesopores communicating by openings with the exterior surface of the aggregate, which are essentially devoid of substance which interferes with communication between the openings to the exterior surface of the aggregate and the mesopores within the aggregate for conducting reactants and products between the exterior surface of the aggregate and micropores of the zeolite bound in the aggregate.

For purposes of the present invention, the zeolite is selected from the crystalline alumina silicates represented by the following general formula expressed in terms of moles:

$$0.9 \pm 0.2 M_2/_m O : Al_2O_3 : XSiO_2$$

wherein M is selected from the group consisting of metal cations and hydrogen, N is its valence and X is a number from about 1.5 to about 12. Also for the purposes of the present invention, zeolites include aluminosilicates wherein the elements gallium, titanium, and phosphorous may be substituted for some of the aluminum or silicon in the structure. Preferably the zeolites are selected from the group consisting of mordenite, zeolite X, zeolite Y, mazzite, zeolite L, ZSM-5, zeolite beta, zeolite rho, ZK5, titanosilicate, ZSM-5 containing phosphorous, and zeolites having a silicon-aluminum ratio within the range of about 0.75:1 to 100:1, and more preferably are large pore zeolites, such as those selected from the group consisting of mordenite, zeolite X, zeolite Y, mazzite, and zeolite L, wherein the large pore zeolite is most preferably zeolite L, more preferably having a pH within the range of about 9.4 to about 10.0. Most preferably the zeolite L comprises highly crystalline crystallites wherein at least 50% of said crystallites are in the form of distinct circular disc-shaped cylinders with an aspect ratio of less than about 0.5 and with a mean diameter of at least 0.2 micron, and more preferably wherein at least 70% of said crystallites are in the form of such cylinders.

The zeolite L used for purposes of the present invention preferably includes at least one cation selected from the group consisting of potassium, sodium, strontium, barium, calcium, cobalt, lithium, magnesium, rubidium, iron, cesium and mixtures from one or more members selected from the group consisting of potassium, sodium, strontium, barium, calcium, cobalt, lithium, magnesium, rubidium, iron, and cesium, but the preferred cation is at least one member selected from the group consisting of potassium and barium, with potassium being most preferred.

The aggregates or extrudates of the present invention may be loaded with a suitable catalytically active metal to form a catalyst which is regenerable after it becomes deactivated so as to exhibit more than about 70% of the reforming Catalyst Activity Test benzene yield that the catalyst exhibited prior to being subjected to reforming conditions.

The aggregate or extrudates produced in accordance with the present invention in the form of a catalyst include at least one metal selected from the group consisting of Group IB metals, Group VII metals, Group VIII metals, tin, germanium and tungsten, wherein the preferred metal is a Group VIII with platinum being most preferred, in which case the platinum is preferably present in an amount within the range of about 0.3 to 1.5 wt.% of the aggregate or extrudate, and at least about 95% and more preferably about 90% of the platinum is finely dispersed, i.e., having a size less than about 7 Angstrom units, within the pores of the zeolite. In addition to the previously mentioned characteristics of the aggregates, the catalysts produced in accordance with the present invention exhibit a catalyst activity pass through to the bound zeolite of at least about 70% of the catalyst activity of the zeolite.

The present invention is also directed to a reforming process for producing aromatic hydrocarbons which involves contacting a hydrocarbon feedstock under reforming conditions with a catalyst which comprises a zeolite bound in the inorganic metal oxide matrix, as described above, and at least one catalytically active metal formed into an aggregate or extrudate having a crush strength greater than about 0.9 pounds per millimeter, and loss by attrition of less than about 3.0%; and a catalyst activity pass through to the zeolite of at least about 70% of the catalyst activity of the zeolite.

The present invention is also directed to a process for purifying a hydrocarbon feedstock wherein a liquid stream of hydrocarbon feedstock is contacted under conditions suitable for adsorption of contaminants from the hydrocarbon feedstock with aggregates and extrudates produced in accordance with the present invention.

The following is a detailed description of the present invention including the best mode for practicing the invention.

PASTE FORMULATION AND EXTRUSION

In accordance with the preferred embodiment of present invention, zeolite, a metal/inorganic oxide containing aluminum binder, water and a peptizing agent are combined in an intensive mixer to rapidly and intimately mix the ingredients to form a uniform extrudable paste. The amount of water in the paste is adjusted according to the nature of the zeolite, the binder, the degree of peptization, and the ratio of zeolite to binder to achieve a proper consistency for good extrusion.

The metal oxide containing binder preferred for purposes of the present invention is hydrated alumina, such as boehmite or boehmite/pseudo-boehmite mixtures (chemically a crystalline alpha alumina monohydrate), although any suitable source of alumina may be used. The average particle size of the alumina suitable for purposes of the present invention is within the range of about 10 to 100 microns with an average particle size of about 65 microns being more preferred.

A peptizing agent is added to the paste to partially digest the alumina, which strengthens the extrudates. The peptizing agent may be selected from the group of substances having a pH of less than or equal to 4.0 and substances having a pH of greater than or equal to 10.0. Acidic substances which may be used as peptizing agent include acids, acidic alumina sols, aluminum chloride and aluminum bromide. The preferred peptizing agent for purposes of the present invention is nitric acid although other acids and organic acids, such as formic, propionic, oxalic, citric, trichloroacetic, chloroacetic and acetic acids can be used. Alternatively, a suitable base can be used to peptize the alumina since alumina is amphoteric. In this regard, a base containing cations which are the same as the cations in the zeolite are believed to be advantageous so as not to introduce extraneous cations into the zeolite.

The alumina content of the extrudate can range from at least about 20% up to about 99% by weight on dry basis. Generally, extrudate strength increases with increasing alumina content. However, it is preferred to use the least alumina which provides adequate extrudate strength since alumina may induce undesirable reactions and adds cost and bulk to the extrudate. Suitable zeolite extrudates can be produced with the forming procedures described herein using alumina to zeolite ratios at the lower end of the alumina content range, i.e., 25% to 35%, for achieving extrudate strength.

The amount of nitric acid solution (70 wt.% nitric acid in water) added to the paste can range between about 0.5% and 2.5% by weight on dry basis.

Preferred mixers for purposes of producing paste with the requisite consistency for extrusion in accordance with the present invention are intensive batch mixers. A key criterion when choosing a mixer is that the mixer must be able to mix the peptizing agent into a combination of zeolite and alumina to homogeneity quickly, i.e., preferably within five minutes, and more preferably in less than two minutes, after the initial addition of the peptizing agent to the combination of zeolite and alumina, because it has been observed that catalyst activity may be adversely affected if mixing time exceeds five minutes during this step. Another criterion is that a paste having a consistency suitable for forming into aggregates, e.g., by extruding to form extrudates, must be obtained within a total mixing time of 15 minutes or less, as measured from the time when the peptizing agent is initially added to the combination of zeolite and alumina and preferably wherein the total mixing time is less than about 5 minutes.

Accordingly, a paste comprising zeolite, alumina, water and peptizing agent is prepared by agitating the zeolite and the boehmite in an intensive mixer to form a uniform mixture of alumina and zeolite. Preferably no extraneously added water is included at this stage of the process so that the moisture content of the mixture is provided essentially by the water present in the zeolite and absorbed on the alumina. Then the peptizing agent solution is added to the mixture of zeolite and alumina preferably by being poured or sprayed over the paste while the mixer is turning. The peptizing solution is spread evenly over the paste as it is being mixed under intense mixing conditions to promote rapid dispersion to homogeneity and to avoid temporarily forming zones in the paste where acid concentration is high. As previously indicated, this must be accomplished as quickly as possible, preferably in less than two minutes. Finally, the resultant mixture is prepared into a paste by mixing for an additional period of time until the paste has an extrudable consistency, i.e., for a total mixing time of less than 15 minutes and preferably less than about 5 minutes, from the initial addition or introduction of the peptizing agent to the zeolite and alumina.

The paste is then extruded through a die with an extruder. The type of extruder is not particularly critical; for example, single screw, twin screw or ram type extruders are acceptable.

The foregoing procedure for forming zeolite aggregates is preferred for purposes of the present invention. However, other methods of forming a formed zeolite bound in an alumina binder, for example, as disclosed in commonly-owned U.S. patent application Ser. No. 06/880,087, (now abandoned), TROWBRIDGE, the disclosure of which is hereby incorporated in its entirety by reference thereto, may be used to form zeolite aggregates which may be processed in accordance with the procedures described below as another embodiment of the present invention.

CURING

In accordance with the present invention, an aggregate or extrudate composed of zeolite bound in alumina is cured at 180° F. to 250° F. in an appropriate chamber for applying controlled humidity and heat under humid air for a time within the range of about 2 to 5 hours. The curing is done under very humid air, 40% to 100% relative humidity. The type of chamber used is not critical, and suitable chambers include box ovens in which the extrudate is loaded on to trays which are inserted into the oven, or continuous belt dryers in which the extrudate move through the oven and are cured in a continuous process. During curing, the boehmitic alumina binder begins to undergo phase transitions which are part of the extrudate hardening process.

HYDRO-THERMAL CALCINATION

In accordance with the present invention, the aggregates and extrudates are subjected to hydro-thermal calcination. In this regard, hydro-thermal calcination serves to impart requisite mechanical strength to the uncalcined extrudate by forming hydrogen-oxygen bonds which cross-link among alumina particles and between alumina particles and zeolite crystals, while neutralizing acidity and reducing the surface area of the alumina, i.e., passivating the alumina surface. During hydro-thermal calcination, the alumina, which is initially in the boehmitic form, changes to other forms of alumina with a reduction in surface area and acidity.

The hydro-thermal calcination can be done either continuously on a belt moving through an oven or a kiln, or batchwise in a tray oven. The temperature of the extrudate is raised to between 400° F. and 700° F., preferably 570° F., at between 1° F. and 20° F. per minute, and preferably at about 7° F. per minute, and held at a temperature within this range for less than 3 hours, i.e., about 1-2 hours. Heat-up rates above 20° F. per minute are to be avoided to preclude exploding the extrudate by rapid steam expansion. The extrudate is held within the selected first plateau or target temperature range for about one to two hours. Then the extrudate temperature is further raised to between about 1000° F. and 1200° F., preferably 1100° F., again at a heat-up rate of between 5° F. and 20° F. per minute, and preferably at about 7° F. per minute, and held at that temperature for between 2 and 4 hours. The hydro-thermal calcination is done under an atmosphere of 30% to 100% by volume of steam in air at atmospheric pressure. The extrudate is then cooled to ambient temperature over a period of about 1 to 2 hours.

WASHING

The hydro-thermally calcined extrudate is then washed with a washing medium which is preferably an aqueous solution of base. It is believed that the washing serves to remove detrital materials which block access to the zeolite microchannels or micropores of the zeolite and neutralize acidity in the extrudate which could induce deleterious cracking and coking reactions by the finished catalyst. Since the exchangeable cations in the zeolite in the reforming catalyst preferred for purposes of the present invention are primarily potassium, wash medium is a KOH solution so that no ion exchange will occur. After washing, the extrudates are rinsed with water to remove residual base.

The concentration of the wash KOH solution can be in the range of 0.01 to 1.0 Normal. Typically, an amount of wash solution in the range of 1.5 to 3.0 times the weight of the charge of extrudates will suffice. Ambient temperatures have been found to be satisfactory for washing, but temperatures ranging up to about 212° F. may be used, with temperatures within the range of about 50° F. to about 90° F. being preferred.

The washing media suitable for purposes of the present invention include of solutions of base, and solutions containing basic salts of chelating agents. Preferably the solution of base is a solution containing at least one member selected from the group consisting of potassium hydroxide, sodium hydroxide, barium hydroxide, lithium hydroxide, rubidium hydroxide, and cesium hydroxide. Preferred are basic solutions that are effective for dissolving detritial alumina. Suitable washing media include solutions of basic salts of chelating agents, such as basic salts of amino polycarboxylic acids, wherein the solutions of basic salts of amino polycarboxylic acids are selected from the group consisting of solutions of basic salts of nitrilotriacetic acid and basic salts of ethylenediaminetetraacetic acid. Preferably, the solutions are solutions of basic salts of ethylenediaminetetraacetic acid, which are selected from the group consisting of potassium ethylenediaminetetraacetic acid and sodium ethylenediaminetetraacetic acid. After the wash is complete, the wash solution is drained off the extrudates and the batch of extrudates is rinsed with water by repeating the wash procedure with water, in place of KOH solution, until the pH of the wash water falls below 10.8.

The washed extrudate is then cured and hydro-thermally calcined again as described above to complete the production of the catalyst substrate.

EXTRUDATE TESTING

Crush strength of extrudates produced in accordance with the present invention as described herein is tested using ASTM Procedure D4179-82. Crush strength must be greater than 0.9 pound per millimeter and preferably greater than 1.25 pounds per millimeter to hold up in commercial packed bed reactors.

ATTRITION RESISTANCE

Loss by attrition of extrudates produced in accordance with the present invention as described herein is tested using ASTM Procedure D4058-81. Loss by attrition should be less than about 3.0% to be suitable for commercial application, and preferably less than about 2.0%.

FILM COATINGS

The absence or presence of film or skin coatings over the outer surfaces of the extrudate and zeolite crystals using a conventional electron microscopes can be detected at 10000X magnification. Both types of film interfere with flow of reactants and products to and from active catalytic sites in the microchannels or micropores of the zeolite.

Figure 2A:
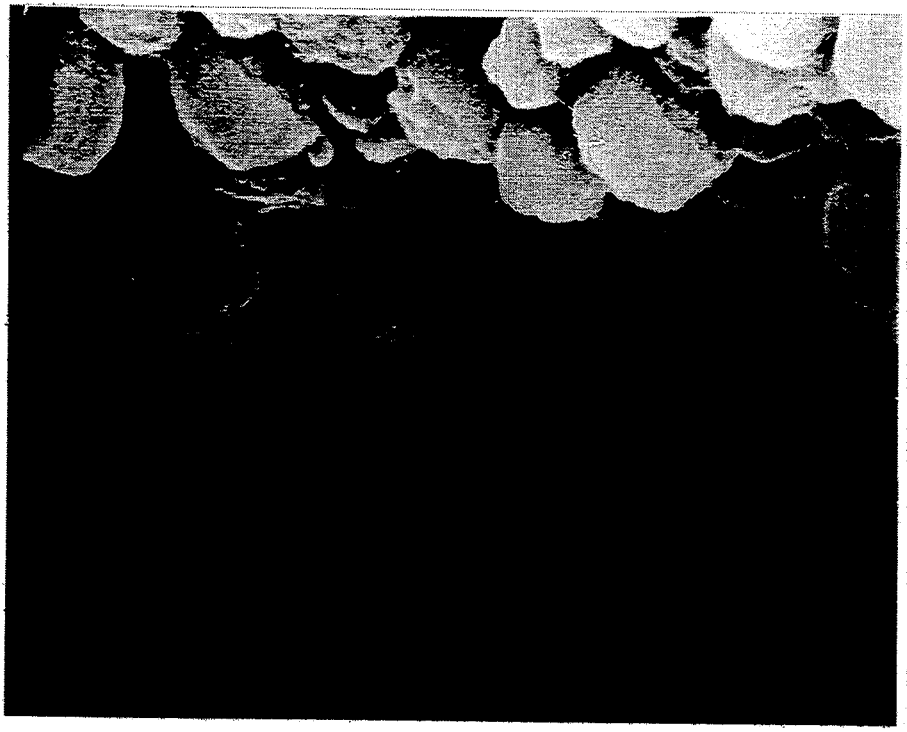
FIGS. 2A, 2B and 2C are electron microscope photomicrographs, also at 10000X magnification, of a zeolite extrudate particle which has no film or skin around its outer surfaces.
Figure 2B:
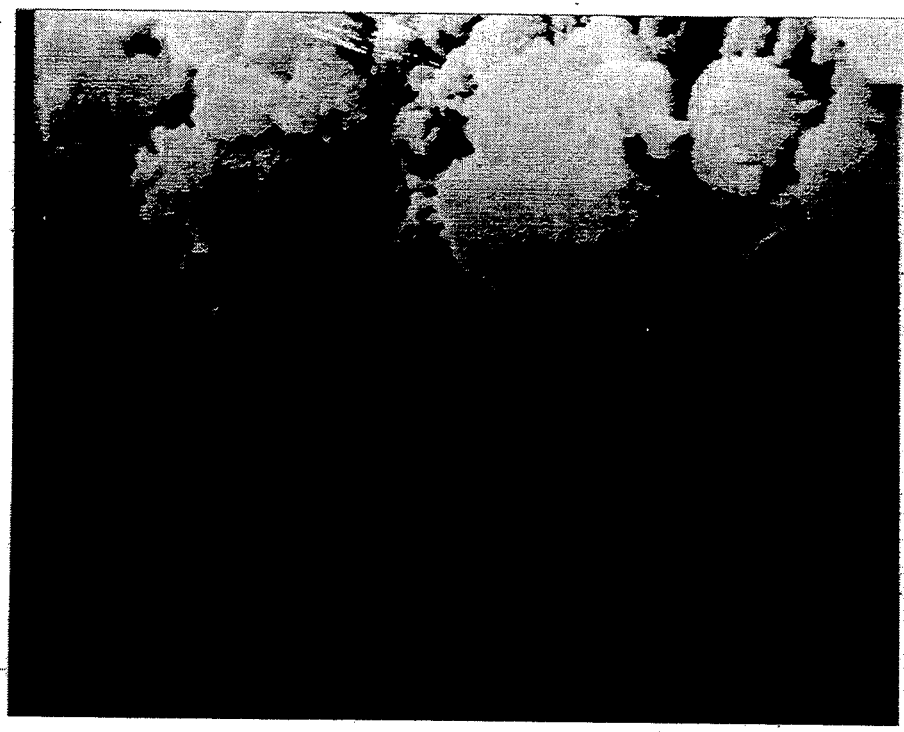
Figure 2C:

FIGS. 2A, 2B and 2C are electron microscope photomicrographs, also at 10000X magnification, of a zeolite extrudate particle which has no film or skin around its outer surfaces or around individual zeolite crystals.

Figure 3A:
FIGS. 3A, 3B and 3C are electron microscope photomicrographs, at 10000X magnification, of a zeolite extrudate particle which has a tough impervious film or skin around its outer surfaces.
Figure 3B:
Figure 3C:
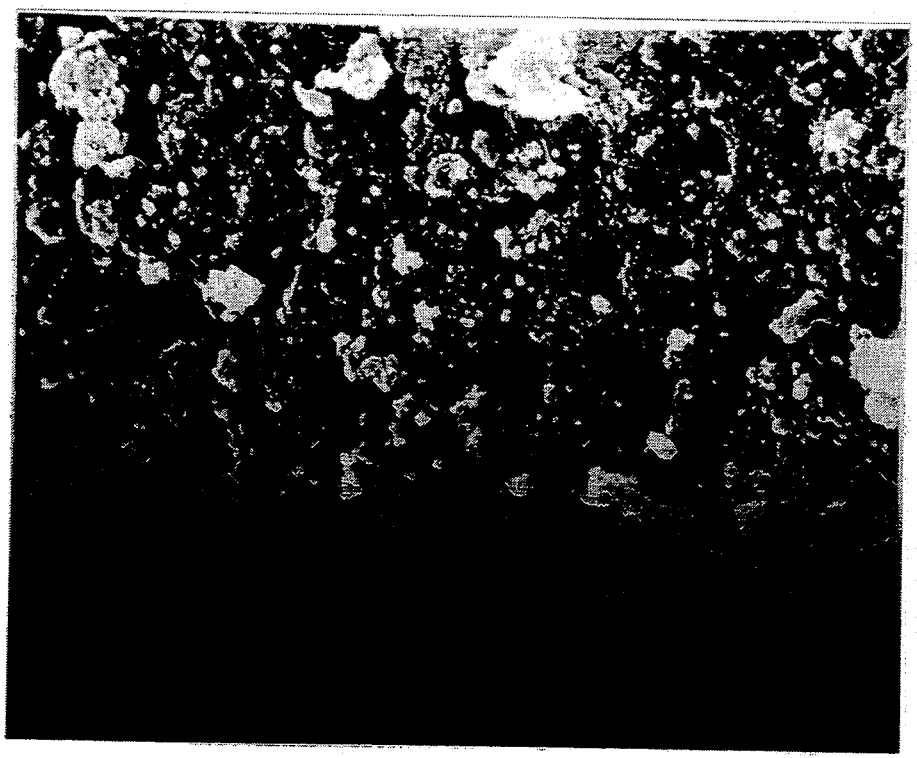

FIGS. 3A, 3B and 3C are electron microscope photomicrographs, at 10000X magnification, of a zeolite extrudate particle which has a tough impervious film or skin around its outer surfaces.

ZEOLITE L SYNTHESIS

Large pore zeolites are defined for purposes of the present invention as zeolites having an effective pore diameter between 6 and 15 Angstroms. It has been established that large pore zeolite catalysts containing at least one Group VIII metal are efficacious for reforming C6 to C8 naphtha petroleum fractions. Of all large pore zeolites, zeolite L is preferred for this application, although mordenite, zeolite X, zeolite Y, and mazzite may be suitable for purposes of the present invention.

Zeolite L, its x-ray diffraction pattern and its properties, are described in detail in U.S. Pat. Nos. 3,216,789, and 3,867,512, the disclosures of which are hereby incorporated by reference in their entirety. A composition of type L-zeolite expressed as mole ratios of oxides may be represented as follows:

$(0.9-1.3)M_{2/n}:Al_2O_3(5.2-6.9) SiO_2:yH_2O$ wherein M designates a cation, n represents the valence of M and y may be any value from 0 to 9. The chemical formula can vary without changing the parallel channel crystalline structure which is the distinguishing feature of zeolite L. For example, the silicon to aluminum ratio may vary from 1.5 to 200:1.

Type L zeolites are conventionally prepared such that the M cation in the above formula is potassium. See U.S. Pat. Nos. 3,216,789 and 3,867,512. The potassium can be ion exchanged, as is well known, by treating the zeolite with an aqueous solution containing the cations to replace potassium. However, it is difficult to exchange more than 75% of the original potassium cations inaccessible to foreign cations. Suitable cations which can be exchanged for strontium, rubidium and calcium. Barium has been reported to be a particularly advantageous cation for catalysts, but potassium is most preferred for purposes of the present invention.

The catalytic performance of a zeolite L reforming catalyst depends on the morphology of the zeolite crystals, i.e., their shape, form and regularity. The morphology of the zeolite preferred for reforming catalysts is specified in U.S. Pat. No. 4,544,539, and procedures to synthesize zeolite L with this morphology are specified in U.S. Pat. No. 4,701,315, the disclosures of which are hereby incorporated by reference in their entirety thereto.

The zeolite L preferred for use for purposes of the present invention has at least 50% of the zeolite crystallites which are circular cylinders with an aspect ratio of at least 0.5, the crystallites have a mean diameter of at least 0.2 microns, and the range of crystallite diameters is 0.1 to 2.5 microns. As used herein aspect ratio means the length of the cylinder surface to the diameter of the cylinder.

The zeolite L powder as it emerges from the crystallizer in which it is synthesized must be separated from its crystallization mother liquor and appropriately washed to remove mother liquor residues. The pH or the mother liquor is high, typically over 12. It has been discovered that superior catalysts are produced when the zeolite crystals are washed with water until their pH falls into the range of 9.4 to 10.0 to achieve peak catalytic activity. Procedures for filtering and washing the zeolite crystals and testing their pH are described in commonly owned pending U.S. patent application Ser. No. 259,644 by KAO et al., the disclosure of which is hereby incorporated by reference in its entirety.

METAL LOADING TO PREPARE CATALYST

In order to complete the preparation of the reforming catalyst, catalytically active metals are dispersed into the zeolite in the extrudate. The catalytic metals include one or more from Groups IB, VII and VIII of the Periodic Table. Platinum, rhenium and iridium are often used. Other metals can be added in addition to Group VIII metals to promote the activity and stability of the catalyst. These include tin, iron germanium and tungsten.

The catalytic metals can be added either during synthesis of the zeolite to the zeolite crystals prior to forming the extrudate or into the whole extrudate after forming.

A common procedure which is used to add metals to the substrate is impregnation. This can be accomplished by either soaking in platinum salt solution or by adding platinum salt solution to the zeolite to incipient wetness. The distinguishing feature of impregnation techniques are that the metal salts used contain the metals in anionic radicals, which means that the metals do not attach to the zeolite by ion exchange. For platinum aqueous solutions of as chloroplatinous acid, hexachloroplatinic acid, dinitrodiaminoplatinum and platinum tetramine dichloride are commonly used. Impregnation can be done adding a measured amount of the appropriate salt solution to the substrate or by dunking the substrate into a bath of salt solution in which the salt concentration has been adjusted so that the liquid retained by the substrate when it is removed from the bath contains the desired quantities of metals.

Alternatively, the catalytic metals can be introduced using salts in which the metals are in the cations of the salts. In this case the metals attach to the zeolites via ion exchange as well as by impregnation. Ion exchange metal loading can be accomplished by dripping the salt solution into the substrate or by total immersion of the substrate into a bath of salt solution. Platinum tetramine dichloride, a salt in which the platinum is present as a cation, is commonly used to add platinum to zeolites via ion exchange.

Examples of platinum salts suitable for impregnation procedures include aqueous solutions of tetramineplatinum (II) nitrate, tetramineplatinum (II) chloride, or dinitrodiamino-platinum (II). For ion exchange a salt containing a cationic platinum complex such as tetramineplatinum (II) nitrate is required.

For purposes of the present invention it is preferred to load the platinum into extrudate using an ion exchange soaking procedure in which we control the amount of platinum and potassium added to the extrudate and also final pH of the loading solution as the extrudate is withdrawn from the loading vessel. A preferred metal loading procedure is described in detail in commonly-owned U.S. Pat. No. 4,568,656, the disclosure of which is hereby incorporated by reference in its entirety.

Preferred zeolite reforming catalysts are those in which the platinum is well dispersed into the zeolite micropores, such that at least 70% and more preferably at least 90% of the platinum particles have diameters less than 7 Angstroms.

Preferably platinum alone in the amount of 03 to 1.5 wt.% is loaded onto the extrudate, preferably using the ion exchange immersion procedure using platinum tetramine dichloride salt. Representative procedures for producing catalysts, and preferably reforming catalysts, suitable for purposes of the present invention are disclosed in U.S. Pat. No. 4,568,656 to POEPPELMEIER et al. and U.S. patent application Serial Nos. 107,211 and 099,432. Moreover, as discussed in U.S. Pat. Nos. 4,595,668, POEPPELMEIER, 4,595,669, FUNG et al., and 4,595,670, TAUSTER et al., superior catalysts are obtained when at least 90% of the metals added to the catalyst prior to reduction are less than 7 Angstrom units in size. The disclosures of U.S. Pat. Nos. 4,568,656; 4,595,668; 4,595,669; and 4,595,670, as well as commonly-owned U.S.S.N. Ser. No. 99,432 and 107,211, are hereby incorporated herein in their entirety by reference thereto.

A procedure for loading platinum into the extrudates in accordance with the present invention is as follows:

1) A concentrated KOH solution is prepared by dissolving 80.0 grams of 85% KOH in 200 grams of water.
2) 9.7055 grams of platinum tetramine dichloride is then dissolved in 1400.00 grams of water.
3) 14.70 grams of the KOH solution and 7.2717 grams of KCL is added to the above solution.
4) Water is added in an amount sufficient to make 1440 grams of platinum loading solution having a pH of 12.5 to 12.7.
5) The platinum solution is circulated through 800.00 grams of extrudate for 1.5 hours, before draining the platinum solution and storing the extrudates in a plastic bag.
6) The wet platinum-loaded extrudate as a resultant catalyst is aged/stored in the plastic bag at about 50° C. for 20 hours.
7) The catalyst is then dried and calcined as per previous discussion.

REFORMING OPERATION

The catalysts produced in accordance with the present invention have been discovered to be particularly effective in overcoming the previously discussed problems associated with using conventional reforming catalysts in reforming procedures wherein a hydrocarbon feed is exposed to the catalyst under reforming conditions.

CATALYST ACTIVITY TEST

The performance of a catalyst is defined by i) its activity: the rate at which the catalyst converts reactant ii) its selectivity: the fraction of the converted reactant that is converted to desired product; and iii) its activity maintenance: the stability of activity and selectivity with increasing time at reaction conditions. As previously mentioned, reforming catalysts deactivate with time at reacting conditions due to coking and agglomeration of the catalytic metals in the catalyst.

An accelerated 46 hour catalyst activity test has been developed which accurately rates the performance of both zeolite L, extruded zeolite L, and extruded zeolite L reforming catalyst.

The zeolite L and extrudates of zeolite L are loaded to 0.64 wt.% platinum. The activity test is conducted at 950° F. at space velocity of 8.0 w/w/hour based on zeolite in the catalyst, i.e., platinum load on unbound zeolite as well as platinum loaded on zeolite bound into an aggregate or extrudate, and 4.25 molar hydrogen to feed ratio. The feed is 40% normal hexane and 60% methyl-pentanes by weight.

The catalyst performance figure of merit is the weight percent benzene yield on feed after 46 hours at test conditions. The ratio of the activity test 46 hour benzene yield of the platinum-loaded zeolite powder unextruded to the same quantity of platinum-loaded zeolite extruded, is referred to herein as the "activity pass through to zeolite ratio" and is a measure of the quality of the extrudate.

Extrudate ratios in excess of 70% are obtained with reforming catalyst extrudates made using techniques in accordance with the present invention. For purposes of the present invention extrudates should pass at least 70% of the activity of the zeolite L through to the catalyst. To be acceptable for purposes of the present invention, a reforming catalyst must demonstrate activity of at least 32 to 33 wt.% benzene yield, based on a standard CAT test.

REGENERATION

Under reforming conditions, reforming catalysts typically loose activity with time due to coking in catalytic metal conglomeration. During reforming, this loss of activity may be compensated for by raising reactor inlet temperatures. However, when the reactor inlet temperature reaches a practical maximum, i.e., a temperature within the range of about 950° F. to about 1050° F. the reactor is normally taken off-line and the catalyst is regenerated. Accordingly, the catalyst produced in accordance with the present invention, as described above, upon being subjected to reforming conditions for extended periods of time, is taken off oil and regenerated in accordance with conventional regeneration procedures. In so doing, the platinum may be redispersed on the catalyst comprising zeolite-L and the inorganic oxide binder by subjecting the catalyst to oxychlorination under oxychlorinating conditions, contacting the catalyst with an inert gas, followed by contacting the catalyst with dry hydrogen. Representative procedures for regenerating catalysts, commonly owned with the present application, include regenerating procedures disclosed in U.S. Pat. No. 4,595,669, FUNG et al., U.S.S.N. Ser. No. 814,027 (now abandoned), FUNG et al., and U.S. Pat. No. 4,914,068, CROSS et al., the disclosures of which are hereby incorporated in their entirety by reference thereto.

As used herein a "regenerable catalyst" for purposes of the present invention is a catalyst which, when subjected to the previously described CAT test, exhibits more than about 70% of the reforming CAT benzene yield that the catalyst exhibited when similarly tested prior to being exposed to the hydrocarbon stream under the specified reforming conditions of the CAT test.

The following is given by way of representative example of a preferred embodiment of the process for producing substantially "skin-free", high catalyst activity pass through to zeolite extrudates having requisite crush strength and resistance to attrition, and regenerability of the catalyst in accordance with the present invention.

EXAMPLE I

Preparation of paste batch 350 lbs. (dry basis) of zeolite L which was determined to contain 150 lbs. of residual water, was blended with 150 lbs. of boehmite, by mixing for five minutes in an intensive mixer. Eleven (11) lbs. 70% of a nitric acid solution dissolved in 81 lbs. of water were distributed uniformly into the batch. The time required to add the aqueous solution of the peptizing agent and distribute it uniformly into the paste was two minutes.

Extrusion

The paste batch was extruded into 1/16" extrudates.

Curing

Figure 4:
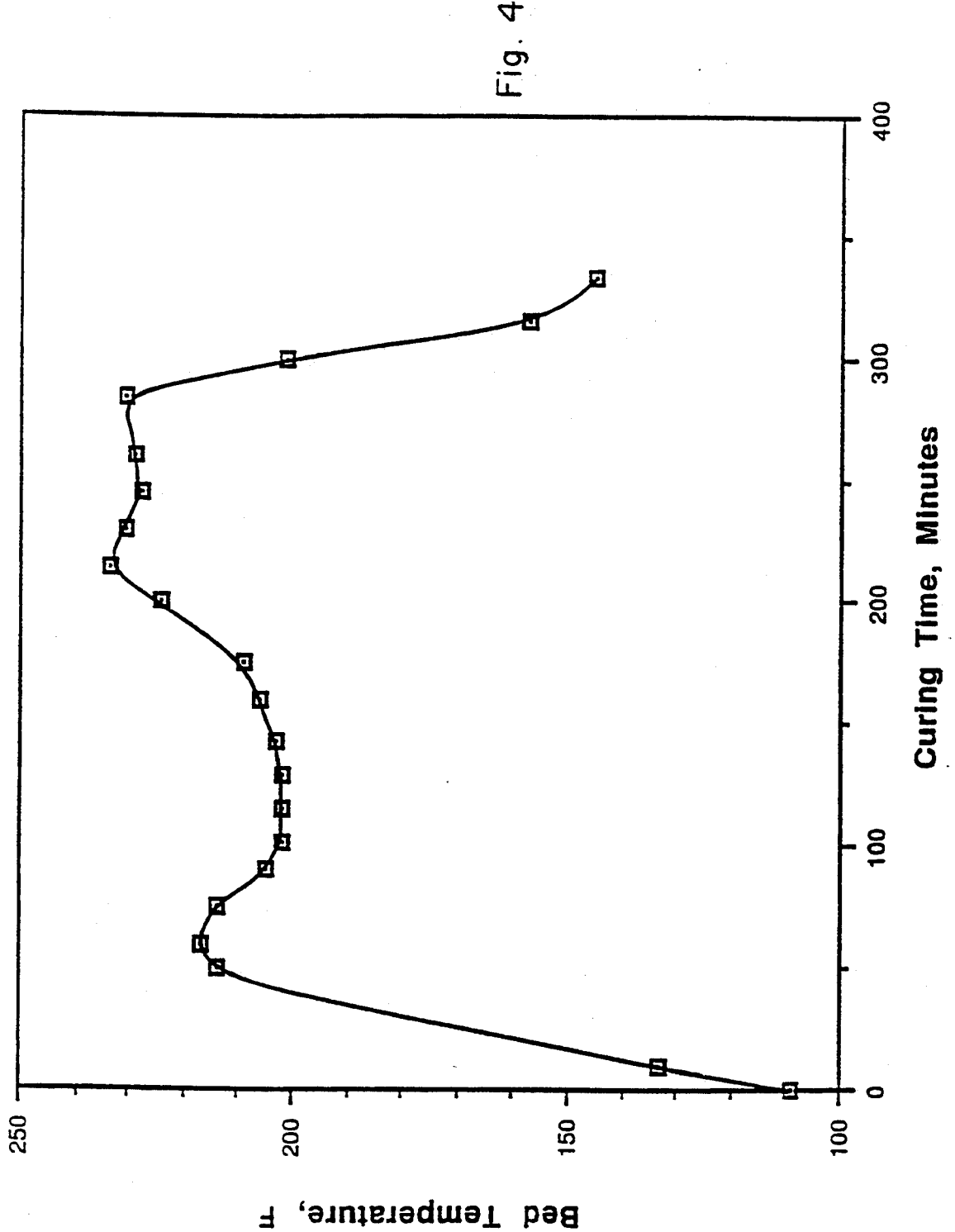
FIG. 4 is a graph of the temperature in the extrudate bed vs. time during curing of the extrudate.

The green or uncured extrudates were placed in covered trays to a depth of approximately 1½. The trays were tightly covered to ensure curing in a humid atmosphere, and placed on a commercial moving belt dryer. Time in the dryer was 200 minutes. FIG. 4 is a graph of the temperature in the extrudate bed vs. time during curing. The temperature of the extrudates was increased from the ambient 75° F. to 220° F. in 50 minutes, held in a range of 200° F. to 240° F. for 280 minutes and cooled rapidly to 150° F.

Hydro-Thermal Calcination

Figure 5:
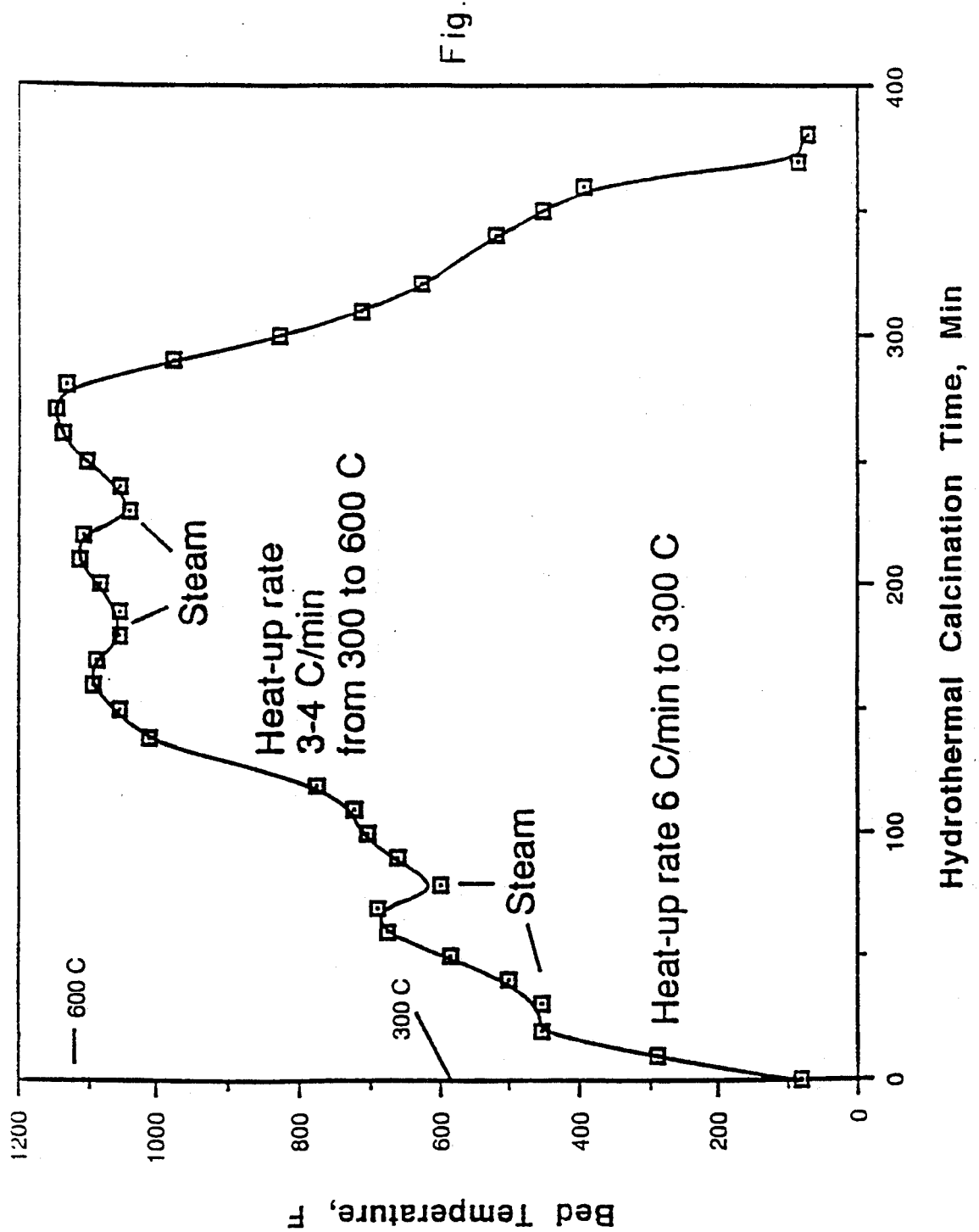
FIG. 5 is a graph of the temperature in the extrudate bed vs. time during hydro-thermal calcination in accordance with the present invention.

The batch of extrudate was hydro-thermally calcined in a commercial continuous moving belt kiln. The steam was injected into the kiln. The steam content of the air in the kiln was calculated to be 70 vol. % water in the air atmosphere over the extrudate. FIG. 5 is a plot of extrudate temperature vs. time in the kiln. The air temperature in each kiln zone is shown also on FIG. 5. The extrudate batch was spread uniformly on the belt to a depth of 1½"–2".

Washing

The hydro-thermally calcined batch of extrudate weighing 450 lbs. dry was transferred to a drum and washed with a solution of 900 lbs. of water containing about 2.5 lbs. of KOH by pumping the KOH solution through the bed of extrudate at a rate of 44 gpm for about 30 minutes. Residual KOH solution was drained from the extrudate and the extrudate batch was washed with 88 gallons of water by circulating the water through the extrudate bed at 44 gpm for about 30 minutes. The water wash procedure was repeated two more times. At the end of the third wash, the pH of the wash water was 10.6.

Second drying and calcination

The washed extrudates were dried and calcined again using essentially the same procedures as described in the first drying and calcination procedures.

Extrudate testing

The extrudate produced by the procedure of Example I, using test procedures previously described, is characterized as follows:
Crush strength-1.5 lb/mm
Attrition loss-1.0%

Inspection of electron microscope photomicrographs of the extrudate at 1000 and 10000 magnification, respectively, showed substantially no skin or film around the exterior of the extrudate and the individual zeolite microcrystals in the extrudate, which would interfere with communication between the micropores of the zeolite, and openings on the exterior surface of the aggregate.

Platinum Loading

Several pounds of the extrudate produced as described above were loaded to 0.64 wt % using previously described metal loading procedures.

Testing Extrudates as Reforming Catalysts

The platinum load extrudate and the zeolite L compounded into the extrudate were both activity tested for reforming activity using the catalyst activity test previously described. Both the platinum loaded extrudate and the zeolite L compounded into the extrudate were loaded to 0.64 wt.% platinum. The benzene yield after 46 hours for the platinum loaded catalyst was 35% and for the zeolite L was 45%. The ratio of these two yields, which is the catalyst activity pass-through to zeolite ratio, is 80%.

EXAMPLE II

The following is example of a reforming process which used a reforming catalyst produced in accordance with the present invention. One pound of the catalyst extrudate containing 0.64 wt.% platinum, produced as previously described, was charged into a catalytic reforming pilot unit. The unit included four one inch diameter reactors in series with heaters upstream of each reactor. The reactors were operated adiabatically.

| COMPONENT | Wt. % |
|---|---|
| C5 | 0.36 |
| dimethyl butane | 7.56 |
| i-C6 | 46.05 |
| n-C6 | 29.69 |
| methyl cyclopentane | 5.32 |
| cyclohexane | 0.28 |
| Benzene | 0.38 |
| i-C7 | 4.83 |
| n-C7 | 0.07 |
| dimethyl cyclopentane | 1.12 |
| C8+ | 0.51 |
| toluene | 0.07 |
| C6+ olefins | 3.76 |
| Operating conditions were: | |
| Hydrogen partial pressure | 98 psia |
| Hydrogen to feed molar ratio | 4.5 |
| Weight hourly space velocity | 1.3 |

Catalyst distribution: Lead reactor-18%; second reactor-22%; third reactor 30%; tail reactor 30 Results after 250 hours:

| Hours On Oil | |
|---|---|
| | 250 |
| Average Temperature, °C. | 500 |
| Benzene, Wt. % On Feed | 35 |
| Selectivity, Wt. % | 62 |

The preceding data, particularly its CAT rating, indicates the superior performance of catalysts produced using the techniques of this invention.

EXAMPLE III

A cured extrudate prepared following the procedure described in Example I was hydro-thermally calcined under steam at 600° F. for thirty (30) minutes, and then at 1250° F. for twenty (20) minutes with a heat-up rate of 60° F. per minute. Subsequently, however, the hydro-thermally calcined extrudate was washed with KOH and rinsed with water, in a manner consistent with the procedure used in Example I. The extrudate was then converted to a reforming catalyst by adding platinum.

The resultant catalyst exhibited a CAT rating of only 27 wt.% benzene yield in contrast to a hydro-thermally calcined extrudate produced completely in accordance with the present invention which exhibited a CAT rating of 35 wt.% benzene when converted to a reforming catalyst.

EXAMPLE IV

A batch of extrudate was prepared in accordance with the procedure used in Example I. Prior to washing, however, the batch of hydro-thermally calcined extrudates was divided into two samples. One sample was directly converted to a reforming catalyst by adding platinum. The second sample was washed with a KOH solution and rinsed with water, as in Example I, followed by curing and hydro-thermally calcining a second time followed by conversion to a reforming catalyst by metal loading with platinum.

The extrudates which had been washed with KOH exhibited a CAT rating of 34.5 wt.% benzene yield, whereas the extrudates which had not been washed with a KOH solution exhibited a CAT rating of only 30.8 wt.% benzene yield.

EXAMPLE V

An extrudate produced in accordance with the procedure described in Example I and converted to a catalyst by adding platinum was tested and determined to have a CAT rating of the fresh catalyst of 35 wt.% benzene yield. After the catalyst was operated on oil for 100 hours under the conditions set forth below, the catalyst was regenerated following the procedure listed below.

Regeneration Procedure
Coke Burn
1.1) 1 hour heat-up to 510° C.
1.2) 10% $O_2/N_2$:
 Air 500 ml/min
 $N_2$ 500 ml/min
2) 16 hours burn at 510° C.
Oxychlorination
1.1) 6 hours at 510° C.
1.2) 10.% $O_2/N_2$:
 Air 500 ml/min
1.3) 0.324% $HCl/N_2$:
 5.% $HCl/N_2$ 64.8 ml/min
1.4) 3.35% $H_2O/N_2$
 $H_2O/N_2$ 437.3 ml/min
 $H_2O$ vapor temperature 41° C.
2) Cool to room temperature under dry $N_2$
3) 30 min heat-up to 510° C.
4) 15 min oxychlorination at 510° C. (with the same gas compositions as before
5) 5 hours oxychlorination cool down to 345° C.
Wet Air Soaking
1.1) 1 hour wet air soak at 345° C.
1.2) 10.% $O_2/N_2$:
 Air 500 ml/min
1.3) 3.35% $H_2O/N_2$:
 $H_2O/N_2$ 437.3 ml/min
 $H_2O$ vapor temperature 41° C.
1.4) Dry $N_2$ 63 ml/min
Dry $N_2$ Purge
1.1) ½ hour dry $N_2$ purge at 345° C.
1.2) Dry $N_2$ 1000 ml/min
$H_2$ Reduction
1.1) 1 hour dry $H_2$ reduction at 345° C.
1.2) 20% $H_2/N_2$:
 $H_2$ 200 ml/min
 $N_2$ 800 ml/min
2) Cool to room temperature under dry $N_2$ The CAT rating of the regenerated catalyst was 33 wt.% benzene yield.

An important characteristic of the reforming catalyst produced in accordance with the present invention is that the reforming catalyst is regenerable to a relatively high percent of its initial fresh activity.

EXAMPLE VI

The photomicrographs of FIGS. 2 and 3 were taken with a conventional scattering transmission electron microscope (SEM) using conventional techniques at 10000 X magnification which illustrates the difference between "skin-free" extrudates in accordance with the present invention (FIGS. 2A, 2B and 2C) and extrudates with "skin" around both the exterior surfaces of the x-rayed particle and the individual zeolite crystals (FIGS. 3A, 3B and 3C).

The photomicrographs identified as (FIGS. 2A, 2B and 2C) were taken of extrudates produced following the procedures disclosed herein for producing aggregates and extrudates in accordance with the present invention. An extrusion paste was prepared by combining 56 pounds (dry basis) of zeolite L with 34 pounds of boehmite alumina in an intensive mixture. A solution of 1.6 pounds of 70% nitric acid in 13 pounds of water was sprayed over the powder mixture and blended uniformly into the paste in 2 minutes. The paste mixing was continued for 3 more minutes, followed by extrusion through 1/16" dies. The extrudates were cured for 2 hours under steam at one atmosphere in covered trays and hydro-thermally calcined for 2 hours at 600° C. under steam. The extrudate was then washed with 160 pounds of 0.5 normal KOH solution, drained and triple-rinsed with 160 pounds of water used during each rinsing. The curing and hydro-thermally calcined treatments were then repeated. Referring to FIGS. 2A, 2B and 2C, it can be noted that the individual cylinders of zeolite crystals are essentially free of skin or film coatings as are the exterior surface of the extrudate particles. These extrudates, when tested in a manner consistent with the procedures described herein, exhibited in CAT ratings of 34% benzene yield.

Referring to FIGS. 3A, 3B, and 3C, these are representative microphotographs of extrudates produced using techniques not in accordance with the present invention. These extrudates were produced using an alumina sol recipe. The extrusion paste of alumina blend includes 72 wt.% of zeolite L, 21% alumina in the form of a sol (Nyacol AL20), and 7% alumina from boehmite. The paste was dried under air at 120° C to reduce the water content of the paste to about 35%, and then the paste was extruded through a 1/16" dye. The extrudates were dried under air at 120° C. for thirty minutes and calcined under air at 500° C. for 3 hours.

It will be noted that these extrudates exhibit a relatively thick, impervious coating of alumina which surround the zeolite particles and which coat the outer surface of the entire extrudate particle. When these extrudates were tested for reforming activity using the CAT procedure, as described herein, they tested at about 21% benzene yield vs. the 35% benzene yield which is considered to be suitable for purposes of catalyst activity and is consistent with aggregates and extrudates produced in accordance with the present invention.

Adsorption

Aggregates and extrudates produced in accordance with the present invention, exhibiting the previously discussed characteristics, may also be suitable for use as adsorbents for separating and/or purifying hydrocarbons by contacting the hydrocarbon under conditions suitable for adsorption of targeted components from the hydrocarbons with aggregates, such as extrudates, produced in accordance with the present invention. The aggregates and extrudates of the present invention may also be used to isolate certain fractions or components of the hydrocarbon stream. Conventional processes for purifying and/or isolating specific hydrocarbon stream using solid adsorbents generally involve contacting a bed containing the solid adsorbent material with the cruder hydrocarbon stream in either the liquid or vapor phase under conditions which favor adsorption. During such contacting, a relatively minor portion of the hydrocarbon stream is adsorbed into pores of the solid adsorbent. Depending on the particular process, and the product involved, the adsorbent may be used to adsorb the desired product, which is then desorbed and recovered, or to adsorb undesired contaminants, resulting in an effluent which is the purified product.

Although the aggregates and extrudates containing zeolites produced in accordance with the present invention may be employed in conventional adsorption processes, a preferred adsorption procedure involves purifying a hydrocarbon feedstock which contains at least one contaminant selected from the group consisting of aromatic compounds, nitrogen-containing compounds, sulfur-containing compounds, oxygen-containing compounds, color bodies, and mixtures thereof, involves the steps of contacting a liquid feed stream of the hydrocarbon feedstock with an adsorbent comprising a zeolite under conditions suitable for the adsorption of at least one contaminant by the zeolite to produce a contaminant-loaded zeolite.

Although the invention has been described with respect to particular means, materials, and embodiments, it is to be understood that the invention is not limited to the particulars disclosed and extends to all equivalents within the scope of the claims.

What is claimed is:

1. A process for producing hardened zeolite aggregates from aggregates made from a formable paste comprising zeolite, an inorganic oxide containing aluminum, a peptizing agent and water, said process comprising the following steps in sequence:
   a) curing said aggregate under a humid atmosphere at a temperature between about 180° F. and about 250° F. to induce initial hardening phase transitions in said aggregate to result in a cured aggregate;
   b) hydro-thermally calcining said cured aggregate under a humid atmosphere at temperatures between about 400° F. and about 1400° F. for a time to complete the hardening phase transitions to result in a hydro-thermally calcined aggregate; and
   c) washing said hydro-thermally calcined aggregate with an aqueous solution of base to remove detritus and neutralize acidity followed by rinsing said washed aggregate with water.

2. The process in accordance with claim 1, wherein said curing at said temperatures is performed for a time within a range of about 1 to about 20 hours.

3. The process in accordance with claim 2, wherein said curing comprises subjecting said aggregate to a temperature of about 195° F.

4. The process in accordance with claim 3, wherein said curing at said temperatures is performed for a time within the range of about 2 to 6 hours.

5. The process in accordance with claim 1, wherein said humid atmosphere comprises a volume percent water within the range of about 40% to about 100%.

6. The process in accordance with claim 1, wherein said time is less than about 15 hours.

7. The process in accordance with claim 1, wherein said hydro-thermal calcining comprises raising the temperature of said aggregate from an initial temperature to a first target temperature within a range of about 400° F. to about 700° F.

8. The process in accordance with claim 7, wherein said first target temperature is about 570° F.

9. The process in accordance with claim 7, wherein said raising the temperature of said aggregate comprises increasing the temperature of said aggregate from an initial temperature to said target temperature at a rate within the range of about 1° F. to about 20° F. per minute.

10. The process in accordance with claim 9, wherein said rate is about 7° F. per minute.

11. The process in accordance with claim 7, wherein said hydro-thermal calcining further comprises maintaining said first target temperature for a time of less than about 5 hours.

12. The process in accordance with claim 11, wherein said time is within the range of about 1-3 hours.

13. The process in accordance with claim 12, wherein said hydro-thermal calcining further comprises increasing the temperature of said aggregate to a second target temperature higher than said first target temperature but less than about 1400° F.

14. The process in accordance with claim 13, wherein said second target temperature is within the range of about 1000° F. to about 1200° F.

15. The process in accordance with claim 14, wherein said increasing said temperature of said aggregate to said second target temperature comprises increasing the temperature of said aggregate from said first target temperature at a rate within the range of about 1° F. to about 20° F per minute.

16. The process in accordance with claim 15, wherein said rate is about 7° F. minute.

17. The process in accordance with claim 15, wherein said hydro-thermal calcining further comprises maintaining said second target temperature for a time of less than about 12 hours.

18. The process in accordance with claim 17, wherein said time is for about 4 hours.

19. The process in accordance with claim 14, wherein said humid atmosphere during said hydro-thermally calcining comprises a volume percent water within the range of 30% to 100%.

20. The process in accordance with claim 19, wherein said volume percent water is within the range of about 50% to about 80%.

21. The process in accordance with claim 1, wherein said water is deionized water.

22. The process in accordance with claim 21, wherein said rinsing is continued until the pH of effluent water is reduced to a pH within the range of about 10-11.

23. The process of claim 22, wherein said pH of effluent water is within the range of about 10.5 to about 10.8.

24. The process in accordance with claim 1, wherein said aqueous solution of base and said water medium are at temperatures ranging from ambient up to about 212° F.

25. The process in accordance with claim 1, wherein said aqueous solution of base and said water have temperatures within the range of about 50° F. to about 90° F.

26. The process in accordance with claim 1, wherein said basic aqueous solution of base comprises a substances for neutralizing acidity in said hydro-thermally calcined aggregate.

27. The process in accordance with claim 26, wherein said aqueous solution of base comprises a member selected from the group consisting of solutions containing basic salts of chelating agents.

28. The process in accordance with claim 26, wherein said aqueous solution of base comprises a solution containing at least one member selected form the group consisting of potassium hydroxide, sodium hydroxide, barium hydroxide, lithium hydroxide, rubidium hydroxide, and cesium hydroxide.

29. The process in accordance with claim 27, wherein said solutions of basic salts of chelating agents comprise basic salts of amino polycarboxylic acids.

30. The process in accordance with claim 29, wherein said solutions of basic salts of amino polycarboxylic acids are selected from the group consisting of solutions of basic salts of nitrilotriacetic acid and basic salts of ethylenediaminetetraacetic acid.

31. The process in accordance with claim 30, wherein said solutions of basic salts of amino polycarboxylic acids comprise solutions of basic salts of ethylenediaminetetraacetic acid.

32. The process in accordance with claim 31, wherein said solutions of basic salts of ethylenediaminetetraacetic acid are selected from the group consisting of potassium ethylenediaminetetraacetic acid and sodium ethylenediaminetetraacetic acid, and potassium salts of ethylenediaminetetraacetic acid and sodium salts of ethylenediaminetetraacetic acid.

33. The process in accordance with claim 27 wherein said zeolite comprises a cation and said aqueous solution of base comprises a cation which is the same cation as said cation of said zeolite.

34. The process in accordance with claim 33, wherein said aqueous solution of base comprises a KOH solution.

35. The process in accordance with claim 27, wherein said aqueous solution of base has a concentration within the range of about 0.01 to 1.0 normal.

36. The process in accordance with claim 35, wherein said washing comprises exposing said hydro-thermally calcined aggregates to an amount of said aqueous solution of base in the range of about 1.0 to 5.0 times the weight of said calcined aggregates.

37. The process in accordance with claim 36, wherein said washing is performed for a time within the range of about 5 minutes to about 60 minutes.

38. The process in accordance with claim 1, further comprising drying said washed aggregate.

39. The process in accordance with claim 1, further comprising post curing said washed aggregate.

40. The process in accordance with claim 39, wherein said post curing comprises subjecting said aggregate to post curing temperatures within a range of about 180° F. to about 250° F.

41. The process in accordance with claim 40, wherein said post curing at said post curing temperatures is performed for a post curing time within a range of about 1 to about 20 hours.

42. The process in accordance with claim 41, wherein said post curing is performed under a humid atmosphere.

43. The process in accordance with claim 42, wherein said humid atmosphere comprises a volume percent water within the range of about 40% to about 100%.

44. The process in accordance with claim 39, further comprising post hydro-thermally calcining said post cured aggregate.

45. The process in accordance with claim 44, wherein said post hydro-thermal calcining comprises subjecting said post cured aggregate to a humid atmosphere at elevated post hydro-thermally calcining temperatures and for times which are sufficient to strengthen, harden, and passivate said post cured aggregate without blocking access to micropores in said zeolite or causing permanent structural change to said zeolite.

46. The process in accordance with claim 45, wherein said post hydro-thermal calcining temperatures are less than about 1400° F.

47. The process in accordance with claim 46, wherein said post hydro-thermal calcining comprises raising the temperature of said post cured aggregate to a first post hydro-thermally calcining target temperature within a range of about 400° F. to about 700° F.

48. The process in accordance with claim 47, wherein said post hydro-thermal calcining further comprises increasing the temperature of said post cured aggregate to a second post hydro-thermally calcining target temperature higher than said first target temperature but less than about 1400° F.

49. The process in accordance with claim 48, wherein said increasing said temperature of said post cured aggregate comprises increasing the temperature of said post cured aggregate from an initial temperature and from said first hydro-thermally calcining target temperature at a rate within the range of about 1° F. to about 20° F. per minute.

50. The process in accordance with claim 49, wherein said humid atmosphere comprises a volume percent water within the range of 40% to 100%.

51. The process in accordance with claim 1, wherein said aggregate comprises inorganic oxide containing aluminum comprising a source of alumina.

52. The process in accordance with claim 51, wherein said source of alumina comprises hydrated alumina.

53. The process in accordance with claim 50, wherein said hydrated alumina is a form of alumina selected from the group consisting of commercial grades of alumina.

54. The process in accordance with claim 53, wherein said commercial grades of alumina are selected from the group consisting of boehmite and mixtures of boehmite and pseudo boehmite.

55. The process in accordance with claim 52, wherein said alumina has a particle size within the range of about 10 to about 100 microns.

56. The process in accordance with claim 55, wherein said alumina has an average particle size of about 65 microns.

57. The process in accordance with claim 56, wherein said aggregate comprises a peptizing agent selected from the group consisting of substances having a pH of less than or equal to 4.0 and substances having a pH of greater than or equal to 10.0.

58. The process in accordance with claim 57, wherein said peptizing agent is an acidic substance.

59. The process in accordance with claim 58, wherein said acidic substance is a member selected from the group consisting of an acid, an acidic alumina sol, aluminum chloride and aluminum bromide.

60. The process in accordance with claim 59, wherein said acidic substance is an acid.

61. The process in accordance with claim 60, wherein said acid is selected from the group consisting of organic acids, hydrochloric acid, perchloric acid, hydrobromic acid, and nitric acid.

62. The process in accordance with claim 61, wherein said organic acids are selected from the group consisting of acetic acid, formic acid, proprionic acid, oxalic acid, citric acid, trichloroacetic acid, and chloracetic acid.

63. The process in accordance with claim 61, wherein said acid is nitric acid.

64. The process in accordance with claim 63, wherein said nitric acid is present in an amount within the range of about 0.5% to about 3.0% by weight of said aggregate.

65. The process in accordance with claim 1, wherein said zeolite is selected from the crystalline alumina silicates represented by the following general formula expressed in terms of moles:

$$0.9 \pm 0.2 M_{2/n}O:Al_2O_3:XSiO_2$$

wherein M is selected from the group consisting of metal cations and hydrogen, N is its valence and X is a number from about 1.5 to about 200.

66. The process in accordance with claim 65, wherein said zeolites are selected from the group consisting of mordenite, zeolite X, zeolite Y, mazzite, zeolite L, ZSM-5, zeolite beta, zeolite rho, ZK5, titanosilicate, ZSM-5 containing phosphorous, and zeolites having a silicon-aluminum ratio within the range of about 10:1 to 100:1.

67. The process in accordance with claim 66, wherein said zeolites are large pore zeolites.

68. The process in accordance with claim 67, wherein said large pore zeolite are selected from the group consisting of mordenite, zeolite X, zeolite Y, mazzite, and zeolite L.

69. The process in accordance with claim 68, wherein said large pore zeolite is zeolite L.

70. The process in accordance with claim 69, wherein said zeolite L has a pH within the range of about 9.4 to about 10.0.

71. The process in accordance with claim 69, wherein said zeolite L comprises highly crystalline crystallites wherein at least 50% of said crystallites are in the form of distinct circular disc-shaped cylinders with an aspect ratio of less than about 0.5 and with a mean diameter of at least 0.2 micron.

72. The process in accordance with claim 71, wherein at least 70% of said crystallites are in the form of said cylinders.

73. The process in accordance with claim 69, wherein said zeolite L comprises at least one cation selected from the group consisting of potassium, sodium, strontium, barium, calcium, cobalt, lithium, magnesium, rubidium, iron, cesium and mixtures of one or more members selected from the group consisting of potassium, sodium, strontium, barium, calcium, cobalt, lithium, magnesium, rubidium, iron, cesium.

74. The process in accordance with claim 73, wherein said cation is at least one member selected from the group consisting of potassium and barium.

75. The process in accordance with claim 74, wherein said cation is potassium.

76. The process in accordance with claim 1, further comprising loading said hydro-thermally calcined aggregate after said washing with at least one metal selected from the group of Group IB metals, Group VII metals, Group VIII metals, tin, germanium and tungsten.

77. The process in accordance with claim 76, wherein said at least one metal is a Group VIII metal.

78. The process in accordance with claim 77, wherein said Group VIII metal is platinum.

79. The process in accordance with claim 78, wherein said platinum is present in an amount within the range of about 0.3 to 1.5 wt. % of said aggregate.

80. The process in accordance with claim 79, wherein at least 75–95% by weight of said platinum is dispersed within pores of said zeolite L.

81. The process in accordance with claim 1, wherein said aggregate is a member selected from the group consisting of agglomerates, pellets, pills, prills, spheres, tablets and extrudates.

82. The process in accordance with claim 81, further comprising forming said paste into an extrudate.

83. A process for producing aggregates of zeolite comprising:
a) combining a source of alumina with zeolite to form a uniform mixture comprising alumina and zeolite;
b) adding a peptizing agent and water to form a resultant mixture comprising alumina, zeolite, peptizing agent and water;
c) preparing said resultant mixture into a paste having a consistency suitable for forming, said paste comprising alumina, zeolite, peptizing agent and water;
d) forming said paste into an aggregate;
e) curing said aggregate to result in a cured aggregate;
f) hydro-thermally calcining said cured aggregate to result in a hydro-thermally calcined aggregate;
g) washing said calcined aggregate with a washing medium to result in a washed aggregate;
h) rinsing said washed aggregate with a rinsing medium to result in a rinsed aggregate; and
i) subjecting said rinsed aggregate to a treatment which removes said rinsing medium from said rinsed aggregate.

84. The process in accordance with claim 83, wherein said uniform mixture comprising zeolite and a source of alumina is essentially devoid of extraneously added water and has a moisture content provided essentially by water present in said zeolite and adsorbed on said alumina.

85. The process in accordance with claim 84, wherein said source of alumina is an inorganic oxide containing aluminum.

86. The process in accordance with claim 85, wherein said inorganic oxide comprises hydrates of alumina.

87. The process in accordance with claim 86, wherein said hydrates of alumina are members selected from the group consisting of boehmite, and a mixture of boehmite and pseudo-boehmite.

88. The process in accordance with claim 87, wherein said alumina is in the form of particles having a particle size within the range of about 10 to about 100 microns.

89. The process in accordance with claim 88, wherein said alumina has an average particle size of about 65 microns.

90. The process in accordance with claim 84, wherein said the step of adding said peptizing agent comprises blending said peptizing agent with said uniform mixture of alumina and zeolite under intense mixing conditions.

91. The process in accordance with claim 90, wherein said blending is performed in an intensive mixer.

92. The process in accordance with claim 91, wherein said blending said peptizing agent comprises distributing said peptizing agent substantially evenly into said mixture.

93. The process in accordance with claim 92, wherein said distributing is performed so as to substantially avoid forming zones in said mixture having relatively higher concentrations of said peptizing agent to result in said resultant mixture having a substantially uniform distribution of said peptizing agent.

94. The process in accordance with claim 93, wherein said uniform distribution of said peptizing agent is effected by intensely mixing said peptizing agent into said mixture for less than about 2 minutes after the initial addition of the peptizing agent into said mixture.

95. The process in accordance with claim 90, wherein said peptizing agent is selected from the group of substances consisting of substances having a pH of less than or equal to 4.0 and substances having a pH of greater than or equal to 10.0.

96. The process in accordance with claim 95, wherein peptizing agent is an acidic substance.

97. The process in accordance with claim 96, wherein said acidic substance is selected from the group consisting of an acid, an acid sol, aluminum chloride, and aluminum bromide.

98. The process in accordance with claim 97, wherein said acid substance is an acid.

99. The process in accordance with claim 98, wherein said acid is an organic acid selected from the group consisting of acetic acid, formic acid, oxalic acid, citric acid, trichloroacetic acid, and proprionic acid.

100. The process in accordance with claim 98, wherein said acid is nitric acid in an amount within the range of about 0.5 to about 2.0% by weight on a dry basis.

101. The process in accordance with claim 95, wherein said peptizing agent is a basic substance.

102. The process in accordance with claim 101, wherein said zeolite comprises a cation and said peptizing agent comprises a cation which is the same cation as said cation of said zeolite.

103. The process in accordance with claim 101, wherein said basic substance is KOH.

104. The process in accordance with claim 88, wherein said aggregate has an alumina content within the range of about 25% to 70% on a dry weight basis.

105. The process in accordance with claim 104, wherein said aggregate has an alumina content within the range of about 25% to 35% on a dry weight basis.

106. The process in accordance with claim 94, wherein said step of preparing said paste comprises mixing said resultant mixture for a period of time for a total mixing time after said initial addition of peptizing agent of less than about 15 minutes.

107. The process in accordance with claim 106, wherein said total mixing time is less than about 5 minutes.

108. The process in accordance with claim 106, wherein said consistency of said paste is suitable for extrusion and said forming comprises extruding said paste into an extrudate.

109. The process in accordance with claim 108, wherein said curing comprises subjecting said extrudate to temperatures within a range of about 180° F. to about 250° F.

110. The process in accordance with claim 109, wherein said curing at said temperatures is performed for a time within a range of about 1 to about 20 hours.

111. The process in accordance with claim 109, wherein said curing is performed under a humid atmosphere.

112. The process in accordance with claim 111, wherein said humid atmosphere comprises a volume percent water within the range of about 40% to about 100%.

113. The process in accordance with claim 109, wherein said hydro-thermally calcining comprises subjecting said cured extrudate to a humid atmosphere at elevated temperatures for times which are sufficient to strengthen, harden, and passivate said cured extrudate without blocking access to micropores of said zeolite or causing permanent structural change to said zeolite.

114. The process in accordance with claim 113, wherein said temperatures are less than about 1400° F.

115. The process in accordance with claim 114, wherein said times are less than about 15 hours.

116. The process in accordance with claim 112, wherein said hydro-thermally calcining comprises raising the temperature of said extrudate to a first target temperature within a range of about 400° F. to about 700° F.

117. The process in accordance with claim 116, wherein said hydro-thermally calcining further comprises maintaining said first target temperature for a time of less than about 5 hours.

118. The process in accordance with claim 117, wherein said time is within the range of about 1-3 hours.

119. The process in accordance with claim 116, wherein said hydro-thermally calcining further comprises increasing the temperature of said extrudate to a second target temperature higher than said first target temperature but less than about 1400° F.

120. The process in accordance with claim 119, wherein said second target temperature is within the range of about 1000° F. and 1200° F.

121. The process in accordance with claim 120, wherein said increasing said temperature of said extrudate comprises increasing the temperature of said extrudate from an initial temperature to said target temperatures at a rate within the range of about 1° F. and 20° F. per minute.

122. The process in accordance with claim 121, wherein said rate is about 7° F. minute.

123. The process in accordance with claim 121, wherein said hydro-thermally calcining further comprises maintaining said second target temperature for a time of less than about 12 hours.

124. The process in accordance with claim 123, wherein said time is about 4 hours.

125. The process in accordance with claim 115, wherein said humid atmosphere comprises a volume percent water within the range of 40% to 100%.

126. The process in accordance with claim 125, wherein said volume percent water is within the range of about 60% to about 80%.

127. The process in accordance with claim 109, wherein said washing medium comprises a substance for dissolving detrital alumina from said extrudate.

128. The process of claim 127, wherein said washing comprises rinsing said washed aggregate with a rinsing medium.

129. The process in accordance with claim 128, wherein said rinsing medium is water.

130. The process in accordance with claim 129, wherein said rinsing is continued until the pH of effluent water is reduced to a pH within the range of about 10-11.

131. The process of claim 130, wherein said pH of effluent water is within the range of about 10.5 to about 10.8.

132. The process in accordance with claim 128, wherein said washing medium and said rinsing medium are at temperatures ranging from ambient up to about 212° F.

133. The process in accordance with claim 128, wherein said washing medium and said rinsing medium have temperatures within the range of about 50° F. to about 90° F.

134. The process in accordance with claim 127, wherein said washing medium comprises a substance for neutralizing acidity in said alumina.

135. The process in accordance with claim 134, wherein said washing medium is a member selected from the group consisting of solutions of base and solutions containing basic salts of chelating agents.

136. The process in accordance with claim 135, wherein said washing medium is a solution of base.

137. The process in accordance with claim 133, wherein said solution of base is a solution containing at least one member selected form the group consisting of potassium hydroxide, sodium hydroxide, barium hydroxide, lithium hydroxide, rubidium hydroxide, and cesium hydroxide.

138. The process in accordance with claim 135, wherein said solutions of basic salts of chelating agents comprise basic salts of amino polycarboxylic acids.

139. The process in accordance with claim 138, wherein said solutions of basic salts of amino polycarboxylic acids are selected from the group consisting solutions of basic salts of nitrilotriacetic acid and basic salts of ethylenediaminetetraacetic acid.

140. The process in accordance with claim 139, wherein said solutions are solutions of basic salts of ethylenediaminetetraacetic acid.

141. The process in accordance with claim 140, wherein said solutions of basic salts of ethylenediaminetetraacetic acid are selected from the group consisting of potassium ethylenediaminetetraacetic acid and sodium ethylenediaminetetraacetic acid, and potassium salts of ethylenediaminetetraacetic acid and sodium salts of ethylenediaminetetraacetic acid.

142. The process in accordance with claim 135, wherein said zeolite comprises a cation and said washing medium comprises a cation which is the same action as said cation of said zeolite.

143. The process in accordance with claim 142, wherein said cation is potassium and said washing medium is a KOH solution.

144. The process in accordance with claim 136, wherein said solution of base is within the range of about 0.01 to 1.0 normal.

145. The process in accordance with claim 144, wherein said washing comprises exposing said extrudates to an amount of said solution of base in the range of about 1.0 to 5.0 times the weight of said calcined aggregates.

146. The process in accordance with claim 142, wherein said washing is performed for a time within the range of about 5 minutes to about 60 minutes.

147. The process in accordance with claim 108, further comprising drying said washed extrudate.

148. The process in accordance with claim 108, further comprising post curing said washed extrudate.

149. The process in accordance with claim 148, further comprising post hydro-thermally calcining said cured extrudate.

150. The process in accordance with claim 108, further comprising loading said hydro-thermally calcined extrudate after said washing with at least one metal selected from the group of Group IB metals, Group VII metals, Group VIII metals, tin, germanium and tungsten.

151. The process in accordance with claim 150, wherein said at least one metal is a Group VIII metal.

152. The process in accordance with claim 151, wherein said Group VIII metal is platinum.

153. The process in accordance with claim 152, wherein said platinum is present in an amount within the range of about 0.3 to 1.5 wt. % of said aggregate.

154. The process in accordance with claim 152, wherein at least 75%–95% by weight of said platinum is dispersed within pores of said zeolite L.

155. An aggregate comprising:
an inorganic metal oxide and zeolite crystals having micropores bound into an aggregate, said aggregate having an exterior surface with openings and interstitial spaces communicating by said openings with said exterior surface and said micropores wherein said aggregate exhibits the following characteristics:
   i) a crush strength greater than about 0.9 pound per millimeter;
   ii) a loss by attrition resistance of less than about 3.0%.

156. The aggregate of claim 155, wherein said crush strength is greater than about 1.25 pounds per millimeter.

157. The aggregate of claim 155, wherein said loss by attrition resistance is about 2.0%.

158. The aggregate of claim 155, wherein said inorganic metal oxide comprises hydrated alumina.

159. The process in accordance with claim 158, wherein said hydrated alumina is selected from commercial grades of alumina.

160. The aggregate of claim 159, wherein said commercial grades of alumina are selected from the group consisting of boehmite and mixtures of boehmite and pseudoboehmite.

161. The aggregate of claim 160, wherein said alumina has a particle size within the range of about 10 to about 100 microns.

162. The aggregate of claim 161, wherein said alumina has an average particle size of about 65 microns.

163. The aggregate of claim 161, wherein said amount of alumina is within the range of about 25% to about 35%.

164. The aggregate of claim 155, wherein said zeolite is selected from the group consisting of mordenite, zeolite X, zeolite Y, mazzite, zeolite L, ZSM-5, zeolite beta, zeolite rho, ZK5, titanosilicate, ZSM-5 containing phosphorous, and zeolite having a silicon-aluminum ratio within the range of about 1.5:1 to 200:1.

165. The aggregate of claim 164, wherein said zeolites are large pore zeolites.

166. The aggregate of claim 164, wherein said large pore zeolite is zeolite L.

167. The aggregate of claim 166, wherein said zeolite L has a pH within the range of about 9.4 to about 10.0.

168. The aggregate of claim 166, wherein said zeolite L comprises highly crystalline crystallites wherein at least 50% of said crystallites are in the form of distinct circular disc-shaped cylinders with an aspect ratio of less than about 0.5 and with a mean diameter of at least 0.2 micron.

169. The aggregate of claim 166, wherein said zeolite L comprises at least one cation selected from the group consisting of potassium, sodium, strontium, barium, calcium, cobalt, lithium, magnesium, rubidium, iron, cesium and mixtures of one or more members selected from the group consisting of potassium, sodium, strontium, barium, calcium, cobalt, lithium, magnesium, rubidium, iron, cesium.

170. The aggregate of claim 169, wherein said cation is at least one member selected from the group consisting of potassium and barium.

171. The aggregate of claim 170, wherein said cation is potassium.

172. The aggregate of claim 155, wherein said aggregate is a catalyst further comprising at least one metal selected from the group of Group IB metals, Group VII metals, Group VIII metals, tin, germanium and tungsten, and exhibits a catalyst activity pass through to said zeolite bound in said aggregate of about 70% of catalyst activity of said zeolite.

173. The aggregate of claim 163, wherein said at least one metal is a Group VIII metal.

174. The aggregate of claim 173, wherein said Group VIII metal is platinum.

175. The aggregate of claim 174, wherein said platinum is present in an amount within the range of about 0.3 to 1.5 wt.% of said aggregate.

176. The aggregate of claim 174, wherein at least 75% of said platinum is finely dispersed as particles having a size less than about 7 Angstrom units.

177. The aggregate of claim 176, wherein at least about 90% of said platinum is dispersed within said micropores of said zeolite.

178. The aggregate of claim 155, wherein said aggregate is an extrudate.

179. An aggregate comprising:
a) a metal oxide containing aluminum bound into an aggregate having an exterior surface and mesopores communicating by openings with said exterior surface; and
b) zeolite crystals having micropores bound by said metal oxide into said aggregate, wherein said exterior surface of said aggregate and said zeolite are essentially devoid of substance which interferes with communication among said micropores, said mesopores, and said openings for conducting reactants and products between said exterior surface and said micropores.

180. The aggregate of claim 179, wherein said metal oxide containing aluminum is hydrated alumina.

181. The aggregate of claim 180, wherein said hydrated alumina is alumina selected from the group consisting of boehmite and mixtures of boehmite and pseudo boehmite.

182. The aggregate of claim 181, wherein said alumina has a particle size within the range of about 10 to about 100 microns.

183. The aggregate of claim 182, wherein said alumina has an average particle size of about 65 microns.

184. The aggregate of claim 182, wherein said alumina is present in an amount within the range of about 25% to about 35 % by total weight of said aggregate.

185. The aggregate of claim 179, wherein said zeolite is selected from the group consisting of mordenite, zeolite X, zeolite Y, mazzite, zeolite L, ZSM-5, zeolite beta, zeolite rho, ZK5, titanosilicate, ZSM-5 containing phosphorous, and zeolites having a silicon-aluminum ratio within the range of about 75:1 to 100:1.

186. The aggregate of claim 185, wherein said zeolites are large pore zeolites.

187. The aggregate of claim 186, wherein said large pore zeolite is zeolite L.

188. The aggregate of claim 181, wherein said zeolite L has a pH within the range of about 9.4 to about 10.0.

189. The aggregate of claim 181, wherein said zeolite L comprises highly crystalline crystallites wherein at least 50% of said crystallites are in the form of distinct circular disc-shaped cylinders with an aspect ratio of less than about 0.5 and with a mean diameter of at least 0.2 micron.

190. The aggregate of claim 187, wherein said zeolite L comprises at least one cation selected from the group consisting of potassium, sodium, strontium, barium, calcium, cobalt, lithium, magnesium, rubidium, iron, cesium and mixtures of one or more members selected from the group consisting of potassium, sodium, strontium, barium, calcium, cobalt, lithium, magnesium, rubidium, iron, cesium.

191. The aggregate of claim 190, wherein said cation is at least one member selected from the group consisting of potassium and barium.

192. The aggregate of claim 191, wherein said cation is potassium.

193. The aggregate of claim 179, wherein each metal selected from the group of Group IB metals, Group VII metals, Group VIII metals, tin, germanium and tungsten.

194. The aggregate of claim 193, wherein said at least one metal is a Group VIII metal.

195. The aggregate of claim 194, wherein said Group VIII metal is platinum.

196. The aggregate of claim 175, wherein said platinum is present in an amount within the range of about 0.3 to 1.5 wt. % of said aggregate.

197. The aggregate of claim 195, wherein at least 90% of said platinum is finely dispersed within said micropores.

198. The aggregate of claim 179, wherein said aggregate is an extrudate.

199. The product produced by the process of claim 1.
200. The product produced by the process of claim 5.
201. The product produced by the process of claim 6.
202. The product produced by the process of claim 10.
203. The product produced by the process of claim 15.
204. The product produced by the process of claim 22.
205. The product produced by the process of claim 27.
206. The product produced by the process of claim 44.
207. The product produced by the process of claim 57.
208. The product produced by the process of claim 64.
209. The product produced by the process of claim 66.
210. The product produced by the process of claim 71.
211. The product produced by the process of claim 73.
212. The product produced by the process of claim 74.
213. The product produced by the process of claim 76.
214. The product produced by the process of claim 78.

215. The product produced by the process of claim 80.

216. The product produced by the process of claim 82.

217. The product produced by the process of claim 83.

218. The product produced by the process of claim 84.

219. The product produced by the process of claim 88.

220. The product produced by the process of claim 94.

221. The product produced by the process of claim 165.

222. The product produced by the process of claim 159.

223. The product produced by the process of claim 154.

224. A regenerable catalyst comprising:
a catalyst metal dispersed in zeolite bound by a metal oxide containing aluminum binder into an aggregate, said regenerable catalyst exhibiting a level of regenerability, expressed as a ratio of the catalyst activity test rating of said catalyst as regenerated relative to the catalyst activity test rating of said catalyst in a fresh state prior to operation on oil, of at least 70%.

225. The regenerated catalyst of claim 224, wherein said level of regenerability is at least 80%.

226. The regenerable catalyst of claim 225, wherein said level of regenerability is at least 90%.

227. The regenerable catalyst of claim 224, wherein said zeolite has micropores, said aggregate has an exterior surface with opening and mesopores between particles of said binder and said zeolite, and wherein said exterior surface of said aggregate and said zeolite are essentially devoid of substance which interferes with communication among said micropores, said mesopores, and said openings for conducting reactants and products between said exterior surface and said micropores.

228. The regenerable catalyst of claim 224, wherein said regenerable catalyst exhibits: i) a crush strength of greater than about 0.9 pound per millimeter; ii) a loss by attrition resistance of less than about 3.0%; and iii) a catalyst activity pass through to said bound zeolite of at least about 70% of the initial catalyst activity of the zeolite.

229. The regenerable catalyst of claim 224, wherein said aggregate is formed by:
a) providing a formable paste comprising said zeolite, said metal oxide containing aluminum, a peptizing agent and water;
b) forming said paste into an aggregate;
c) curing said aggregate to result in a cured aggregate;
d) hydro-thermally calcining said cured aggregate to result in a hydro-thermally calcined aggregate; and
e) washing said hydro-thermally calcined aggregate with a washing medium to result in a washed aggregate, before
f) loading said aggregate with a catalytically active metal to result in said regenerable catalyst.

230. The regenerable catalyst of claim 224, wherein said metal oxide containing aluminum is hydrated alumina and said aggregate is formed by:
a) combining said alumina with zeolite to form a uniform mixture comprising alumina and zeolite;
b) adding a peptizing agent and water to form a resultant mixture comprising alumina, zeolite, peptizing agent and water;
c) preparing said resultant mixture into a paste having a consistency suitable for forming, said paste comprising alumina, zeolite, peptizing agent and water;
d) forming said paste into an aggregate;
e) curing said aggregate to result in a cured aggregate;
f) hydro-thermally calcining said cured aggregate to result in a calcined aggregate;
g) washing said calcined aggregate with a washing medium to result in a washed aggregate;
h) rinsing said washed aggregate with a rinsing medium to result in a rinsed aggregate; and
i) subjecting said rinsed aggregate to a treatment which removes said rinsing medium from said rinsed aggregate, before
j) loading said aggregate with a catalytically active metal to result in said regenerable catalyst.

231. The regenerable catalyst of claim 224, wherein said metal oxide containing aluminum is a hydrated alumina.

232. The regenerable catalyst of claim 231, wherein said hydrated alumina is selected from the group consisting of boehmite and mixtures of boehmite and pseudo boehmite.

233. The regenerable catalyst of claim 232, wherein said alumina has a particle size within the range of about 10 to about 100 microns.

234. The regenerable catalyst of claim 233, wherein said alumina has an average particle size of about 65 microns.

235. The regenerable catalyst of claim 233, wherein said zeolite is selected from the group consisting of mordenite, zeolite X, zeolite Y, mazzite, zeolite L, ZSM-5, zeolite beta, zeolite rho, ZK5, titanosilicate, ZSM-5 containing phosphorous, and zeolite having a silicon-aluminum ratio within the range of about 75:1 to 100:1.

236. The regenerable catalyst of claim 235, wherein said zeolite is a large pore zeolite.

237. The regenerated catalyst of claim 236, wherein said large pore zeolite is zeolite L.

238. The regenerable catalyst of claim 237, wherein said zeolite L comprises highly crystalline crystallites wherein at least 50% of said crystallites are in the form of distinct circular disc-shaped cylinders with an aspect ratio of less than about 0.5 and with a mean diameter of at least 0.2 micron.

239. The regenerable catalyst of claim 237, wherein said zeolite L has a pH within the range of about 9.4 to about 10.0.

240. The regenerated catalyst of claim 237, wherein said zeolite L comprises at least one cation selected from the group consisting of potassium, sodium, strontium, barium, calcium, cobalt, lithium, magnesium, rubidium, iron, cesium and mixtures of one or more members selected from the group consisting of potassium, sodium, strontium, barium, calcium, cobalt, lithium, magnesium, rubidium, iron, cesium.

241. The regenerable catalyst of claim 237, wherein said catalyst metal is at least one metal selected from the group of Group IB metals, Group VII metals, Group VIII metals, tin, germanium and tungsten.

242. The regenerable catalyst of claim 241, wherein said at least one metal is a Group VIII metal.

243. The regenerated catalyst of claim 242, wherein said Group VIII metal is platinum.

244. The regenerable catalyst of claim 243, wherein said platinum is present in an amount within the range of about 0.3 to 1.5 wt. % of said aggregate.

245. The regenerable catalyst of claim 244, wherein at least 75%-95% by weight of said platinum is dispersed within pores of said zeolite L.

246. The regenerable catalyst of claim 224, wherein said aggregate is a member selected from the group consisting of agglomerates, pellets, pills, prills, spheres, tablets and extrudates.

247. The regenerable catalyst of claim 246, wherein said aggregate an extrudate.

* * * * *